(12) United States Patent
Hamada

(10) Patent No.: US 10,008,863 B2
(45) Date of Patent: Jun. 26, 2018

(54) BALANCE CORRECTION DEVICE AND POWER STORAGE DEVICE

(71) Applicant: FDK CORPORATION, Tokyo (JP)

(72) Inventor: Kenji Hamada, Tokyo (JP)

(73) Assignee: FDK Corporation, Tokyo (JP)

( * ) Notice: Subject to any disclaimer, the term of this patent is extended or adjusted under 35 U.S.C. 154(b) by 267 days.

(21) Appl. No.: 15/037,145

(22) PCT Filed: Oct. 16, 2014

(86) PCT No.: PCT/JP2014/077552
§ 371 (c)(1),
(2) Date: May 17, 2016

(87) PCT Pub. No.: WO2015/072276
PCT Pub. Date: May 21, 2015

(65) Prior Publication Data
US 2016/0276849 A1    Sep. 22, 2016

(30) Foreign Application Priority Data

Nov. 18, 2013    (JP) .................................. 2013-238225

(51) Int. Cl.
*H02J 7/00* (2006.01)
*B60L 11/18* (2006.01)
*H02J 7/34* (2006.01)

(52) U.S. Cl.
CPC ......... *H02J 7/0019* (2013.01); *B60L 11/1866* (2013.01); *H02J 7/007* (2013.01);
(Continued)

(58) Field of Classification Search
None
See application file for complete search history.

(56) References Cited

U.S. PATENT DOCUMENTS

| 8,428,896 B2 | 4/2013 | Iwasaki et al. |
| 2008/0103707 A1 | 5/2008 | Iwasaki et al. |

FOREIGN PATENT DOCUMENTS

| JP | 2001-185229 A | 7/2001 |
| JP | 2008-017605 A | 1/2008 |

(Continued)

OTHER PUBLICATIONS

International Search Report for PCT/JP2014/077552, ISA/JP, dated Nov. 11, 2014.
(Continued)

*Primary Examiner* — David V Henze-Gongola
(74) *Attorney, Agent, or Firm* — Harness, Dickey & Pierce, P.L.C.

(57) ABSTRACT

In a balance correction circuit including a plurality of converter type balance correction units that control a supply of a current to a plurality of power storage cells by complementarily on/off controlling two switching elements and hereby allowing to exchange power between or among power storage cells via an inductor to equalize the voltages of the power storage cells, a common timing signal used to generate a control signal of a switching element is supplied to each of the above balance correction units. For example, the balance correction circuit generates a timing signal to supply to a first balance correction unit based on a variation in a voltage applied to the capacitive element charged by a voltage difference created between a control signal generated by the second balance correction unit and a second power storage cell cathode of the balance correction unit.

20 Claims, 26 Drawing Sheets

(52) U.S. Cl.
CPC ..... *B60L 2210/10* (2013.01); *B60L 2240/547* (2013.01); *H02J 7/345* (2013.01); *Y02T 10/7005* (2013.01); *Y02T 10/7055* (2013.01); *Y02T 10/7061* (2013.01); *Y02T 10/7216* (2013.01)

(56) References Cited

FOREIGN PATENT DOCUMENTS

| JP | 2008017605 A | * | 1/2008 |
| JP | 2008-108591 A | | 5/2008 |
| JP | 2011-041467 A | | 2/2011 |
| JP | 2013-115882 A | | 6/2013 |
| JP | 2013115882 A | * | 6/2013 |

OTHER PUBLICATIONS

Written Opinion of the ISA for PCT/JP2014/077552, ISA/JP, dated Nov. 11, 2014.

\* cited by examiner

BALANCE CORRECTION DEVICE AND POWER STORAGE DEVICE

CROSS-REFERENCE TO RELATED APPLICATIONS

This application is a 371 U.S. National Stage of International Application No. PCT/JP2014/077552, filed Oct. 16, 2014, which claims the benefit of and priority to Japanese Patent Application No. 2013-238225, filed Nov. 18, 2013. The disclosures of the above applications are incorporated herein by reference.

TECHNICAL FIELD

The present invention relates to a balance correction device and a power storage device that equalize the voltages of power storage cells or power storage modules including a plurality of series connected power storage cells, in an assembled battery including a plurality of series connected power storage cells.

BACKGROUND ART

In an assembled battery configured of a plurality of series connected power storage cells, there is a need to suppress the variances of the voltages (electromotive force) of the power storage cells in order to prevent a discharge capacity reduction and life shortening. Particularly, as in a power storage device used for electric vehicles and the like, there is a need to precisely suppress the voltage variances of the power storage cells in an assembled battery configured of multiple power storage cells.

As a mechanism for equalizing the voltages of the power storage cells, for example, PTL 1 discloses a so-called converter type balance correction method where one end of the inductor L is connected beforehand to a connection point of the series connected secondary batteries B1, B2 and the voltages of the batteries B1 and B2 are equalized by performing for an appropriate period, a repeated short time alternating operation (switching operation) between the first mode where an electric current flows through the first closed circuit formed by connecting the other end of the inductor L to the other end of the battery B1 and the second mode where an electric current flows through the second closed circuit formed by connecting the other end of the inductor L to the other end of the battery B2.

CITATION LIST

Patent Literature

[PTL 1] Japanese Patent Application Laid-open Publication No. 2001-185229

SUMMARY OF INVENTION

Technical Problem

FIG. 23 illustrates an example of a converter type balance correction circuit 7. As shown in FIG. 23, the power storage cells B1 and B2 are connected in series to configure the assembled battery 3. The power storage cell B1 has connected between the positive and negative terminals thereof a switching element S1 as well as a capacitive element C1, and the power storage cell B2 has connected between the positive and negative terminals thereof a switching element S2 as well as a capacitive element C2, respectively. Further, an inductor L is connected between the common connection point J3 of the switching elements S1 and S2, and the connection point J1 of the power storage cells B1 and B2.

The switching elements S1, S2 operate complementarily such that when one switching element is turned on, the other switching element is turned off with the gate drivers G1, G2 which are controlled by the control signals φ1, φ2 that are generated by the control circuit 10. The capacitive elements C1, C2 are provided for the purpose of, for example, reducing the noise created due to the on/off operations of the switching elements, relieving the voltage difference created between the power storage cells B1, B2 due to the on/off operations of the switching elements.

The control circuit 10 controls the on/off of the switching elements S1 and S2 alternatively at a predetermined duty ratio by controlling the gate drivers G1, G2 with the control signals φ1, φ2. Hereby, energy is exchanged between the power storage cells B1 and B2 via the inductor L to equalize the voltages of the power storage cells B1 and B2, as a result.

In FIG. 24, (a) illustrates the waveforms of the control signals φ1, φ2 which are generated by the control circuit 10 during the on/off control period of the switching elements S1, S2. During the above period, the control circuit 10 generates, for example, the control signals φ1, φ2 which are configured of square-waves with the on/off operations being performed complementarily in the same cycle, as illustrated in (a) of FIG. 24.

In FIG. 24, (b) to (d) show the waveforms of the currents iL (hereinafter also called regenerated current) flowing through the inductor L during the on/off control period of the switching elements S1, S2. Among the figures in FIG. 24, (b) shows the waveform of the current iL flowing through the inductor L when the voltage E1 of the power storage cell B1 is higher than the voltage E2 of the power storage cell B2, (c) shows the waveform of the current iL flowing through the inductor L when the voltage E1 of the power storage cell B1 is lower than the voltage E2 of the power storage cell B2, and (d) shows the waveform of the current iL flowing through the inductor L when the voltage E1 of the power storage cell B1 is equal (substantially equal) to the voltage E2 of the power storage cell B2.

When there is a voltage difference between the two power storage cells B1, B2, energy is exchanged between the power storage cells B1 and B2 by the current iL alternatively flowing along the first path and the second path. And as a result, the voltages between the two are equalized to thereby secure a balance.

The configuration indicated above are of a case where the number of the power storage cells is two, however, the configuration can be extended for a case where there are three or more power storage cells.

FIG. 25 illustrates an example of the balance correction circuit 7 which is adapted to equalize the voltages of three power storage cells B1 to B3. In FIG. 25, the control circuit 10A equalizes the voltages of the power storage cells B1 and B2 by complementarily turning on/off the switching elements S1, S2, and the control circuit 10B equalizes the voltages of the power storage cells B2 and B3 by complementarily turning on/off the switching elements S3, S4. The voltage of the power storage cell B2 is equalized with both of the power storage cells B1, B3 with such control, and as a result thereof, the voltages of the three power storage cells B1, B2 and B3 are equalized.

In the balance correction circuit 7 shown in FIG. 25, the control circuits 10A and 10B can perform control independent of each other, that is, the control circuit 10A can control the on/off of the switching elements S1, S2 in parallel with the control circuit 10B controlling the on/off of the switching elements S3, S4 (hereinafter also called, parallel control.) When parallel control is performed, however, for example, if the frequencies of the control signals input (provided to the gate of the switching element) to the switching element during on/off control of the switching elements by each of the control circuits 10A, 10B are not synchronized, issues as in the following may occur.

FIG. 26 exemplifies the control signal φ2 waveform of the switching element S2, the control signal φ3 waveform of the switching element S3, and the voltage waveforms of the connection point in FIG. 25 (the waveforms obtained by the on/off control of the switching elements S1, S2 with the control circuit 10A (waveform having attached the reference character (a), the waveform obtained by the on/off control of the switching elements S3, S4 with the control circuit 10B (waveform having attached the reference character (b), and the waveform obtained by superimposing (combining) the waveform attached reference character (a) with the waveform attached the reference character (b) (waveform having attached the reference character (c)) when the above described parallel control is performed. Although the waveforms φ1, φ4 of the switching elements S1, S4 are not illustrated in FIG. 26, the waveform of the control signal φ1 has a phase opposite that of the waveform of the control signal φ2 and the waveform of the control signal φ4 has a phase opposite that of the waveform of the control signal φ3.

As shown in FIG. 26, the phase difference between the control signals φ2 and φ3 changes along with time since the two are not synchronized. Along with this, the phase difference between the waveform indicated with the reference character (a) and the waveform indicated with the reference character (b) also changes. Therefore, the actual voltage waveform (c) that appears at the connection point J42 is a disordered waveform which includes multiple frequency components and is unstable with respect to time. Such a voltage waveform may be the cause for developing issues such as disturbance and noise, an abnormal regenerated current, abnormal oscillation and the like.

The present invention has been made in view of the above described problems and a subject thereof is to provide a balance correction device and a power storage device which can prevent problems caused by the signals controlling the switching elements being unsynchronized in the control circuits.

Solution to Problem

An invention of the present inventions for achieving the above described objective is a balance correction device that is in an assembled battery including a plurality of series connected power storage cells and equalizes voltages of the power storage cells or of power storage modules that include the series connected power storage cells, the balance correction device comprising: a plurality of balance correction units including an inductor that has one end thereof connected to a connection point between a first one of the power storage modules and a second one of the power storage modules connected in series, a first switching element that is series connected together with the inductor between positive and negative terminals of the first power storage module, a second switching element that is series connected together with the inductor between positive and negative terminals of the second power storage module, a switching control unit that controls a supply of a current to each of the power storage modules by an on/off control of the first switching element and the second switching element to equalize the voltages of the power storage modules by exchanging electric power of the power storage modules via the inductor; and a timing signal supply unit that has the first power storage module of one of the balance correction units line connected with the second power storage module of another one of the balance correction units to be a same one of the power storage modules, and supplies to the respective switching control unit of the balance correction units, a common timing signal used to generate a control signal to input to the first switching element and the second switching element to on/off control the first switching element and the second switching element.

Another of the present inventions is the aforementioned balance correction device wherein the timing signal supply unit directly supplies the timing signal to the respective switching control unit of the balance correction units.

Another of the present inventions is the aforementioned balance correction device wherein the timing signal supply unit includes a first circuit that supplies the timing signal to the switching control unit of a second one of the balance correction units and a second circuit that supplies the timing signal supplied from the timing signal supply unit by the second balance correction unit, to the switching control unit of a first one of the balance correction units.

Another of the present inventions is the aforementioned balance correction device wherein the second circuit generates a timing signal based on the control signal that the switching control unit of the second balance correction unit generates and supplies the generated timing signal to the switching control unit of the first balance correction unit.

Another of the present inventions is the aforementioned balance correction device wherein the second circuit generates the timing signal based on a variation in voltages applied to a capacitive element that is charged by a voltage difference created between the control signal that is generated by the switching control unit of the second balance correction unit and a cathode of the second power storage module of the second balance correction unit.

Another of the present inventions is the aforementioned balance correction device wherein the second circuit charges the capacitive element by a voltage obtained by rectifying a voltage applied to the capacitive element.

Another of the present inventions is the aforementioned balance correction device wherein the second circuit generates the timing signal based on a divided voltage obtained by dividing a voltage applied to the capacitive element.

Another of the present inventions is the aforementioned balance correction device wherein the second circuit generates the timing signal based on a voltage generated at a common connection part of the first switching element and the second switching element of the switching control unit of the second balance correction unit and the inductor.

Another of the present inventions the aforementioned balance correction device wherein the second circuit generates the timing signal based on a variation in voltages obtained by rectifying the voltages generated at the common connection part.

Another of the present inventions is the aforementioned balance correction device wherein the second circuit generates the timing signal based on a variation in voltages obtained by dividing the voltages generated at the common connection part.

Another of the present inventions is a power storage device including the plurality of power storage cells and the balance correction device.

Other problems disclosed by the present application and the methods for solving such problems will become clear from the description of embodiments with reference to the accompanying drawings.

Advantageous Effects of Invention

According to the present invention, issues arising from the signals controlling the switching elements being unsynchronized in the control circuits can be prevented.

DESCRIPTION OF EMBODIMENTS

Description of the embodiments according to the present invention will be given in the following. In the following description, the same or similar parts are attached the same reference numbers to omit duplicate description. Index letters may be omitted from the reference numbers to collectively call the same constituent element (e.g., control circuits 10A, 10B, 10C may be collectively called control circuit 10.)

<Basic Configuration of Balance Correction Circuit>

Figure 1:
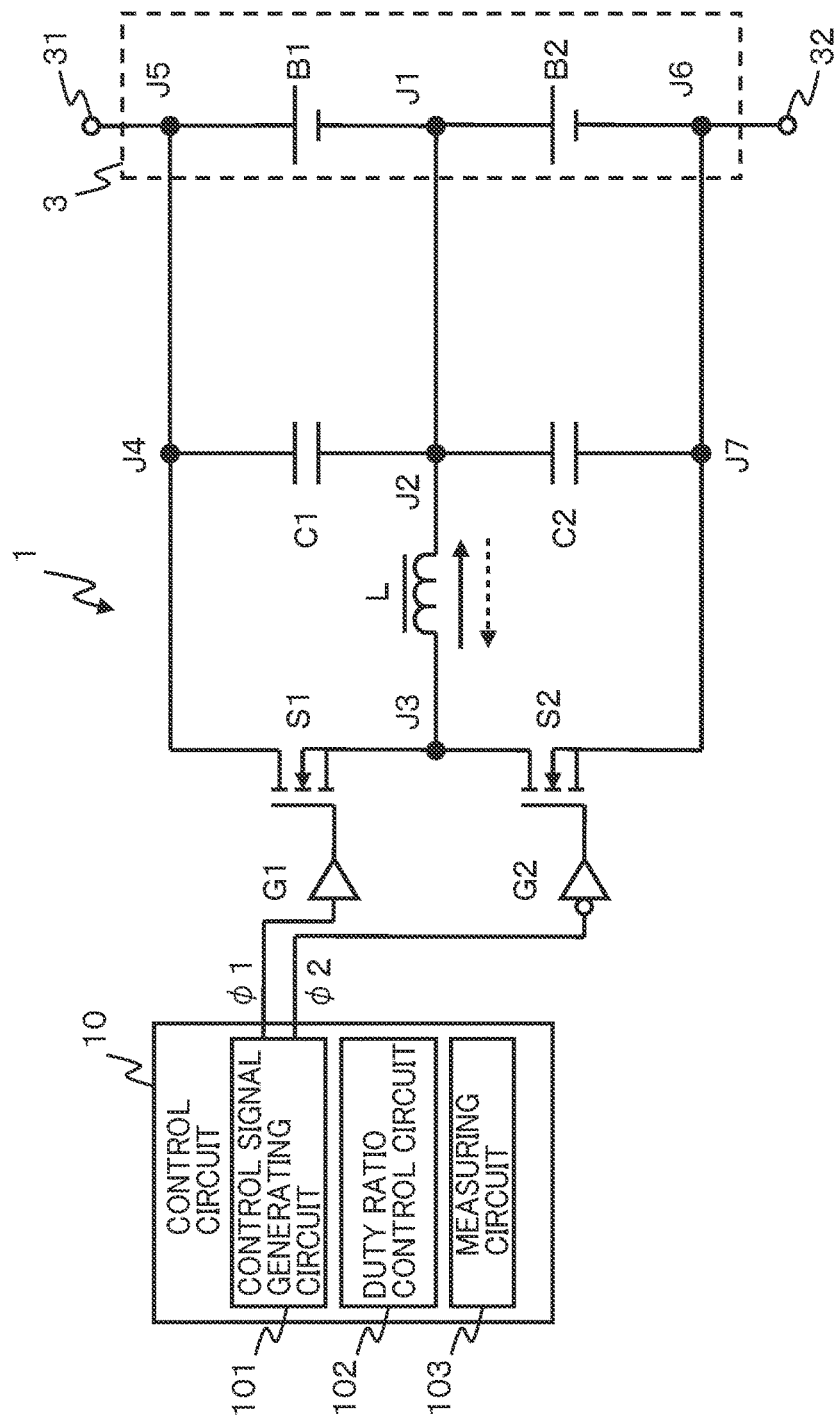
FIG. 1 illustrates an example of a balance correction circuit 1.

FIG. 1 illustrates an example of a converter type balance correction circuit 1 (balance correction device.) The balance correction circuit 1 is, for example, applied to power storage devices (electric vehicles, hybrid vehicles, electric two-wheeled vehicles, railway vehicles, elevators, system tied power storage devices, personal computers, laptop computers, mobile telephone devices, smartphones, PDA instruments etc.) which use an assembled battery including a plurality of series connected power storage cells. A power storage cell is, for example, a lithium ion secondary battery, a lithium ion polymer secondary battery and the like, however, may be other types of power storage elements such as an electric double layer capacitor.

If the degree of manufacturing quality or deterioration differ in the power storage cells configuring the assembled battery, difference in the battery characteristics (battery capacity, discharge voltage characteristics) in the power storage cells may be created so that the voltages of the power storage cells may vary during the charging/discharging of electricity due to the difference in the battery characteristics. For such reason, the balance correction circuit 1 operates to equalize (ensure cell balance) the voltages of power storage cells or of power storage modules configured of a plurality of series connected power storage cells in order to suppress generation of variances as above.

As illustrated in FIG. 1, the assembled battery 3 is configured with series connected power storage cells B1, B2. The positive and negative terminals 31, 32 of the assembled battery 3 have connected thereto, for example, a current supply source (e.g., recharger, regeneration circuit) which supplies a charging current to the assembled battery 3, a load (e.g., motor, electronic circuit, electrical appliances) which function by using the electromotive force of the assembled battery 3 and the like.

The line (line including the point connecting the power storage cells B1, B2 in series) connecting the anode of the power storage cell B1 and the cathode of the power storage cell B2 has connected thereto one end of the inductor L. The line connecting the other end of the inductor L and the cathode of the power storage cell B1 has provided a switching element S1. And the line connecting the other end of the inductor L and the anode of the power storage cell B2 has provided a switching element S2.

The switching elements S1, S2 is configured using a MOSFET (Metal-Oxide-Semiconductor Field-Effect Transistor). The switching elements S1, S2 operate complementarily with the gate drivers G1, G2 which are controlled by the control signals φ1, φ2 that are generated by the control circuit 10 (switching control unit) such that when one switching element is turned on, the other switching element is turned off. Here, the switching elements S1, S2 may be configured using a bipolar transistor.

A capacitive element C1 is provided between one end of the inductor L and the cathode of the power storage cell B1, and a capacitive element C2 is provided between one end of the inductor L and the anode of the power storage cell B2. The capacitive elements C1, C2 are provided for the purpose of, for example, reducing noise generated due to the on/off operations of the switching element, variation in the voltages generated between the power storage cells B1, B2 due to the on/off operations of the switching element and the like. The capacitive element C1 may be provided between, for example, the cathode of the power storage cell B1 and the anode of the power storage cell B2.

The control circuit 10 includes a control signal generating circuit 101, a duty ratio control circuit 102 and a measuring circuit 103 (voltage measuring unit.) The control circuit 10 can be implemented by using a microcomputer including, for example, an arithmetic device (CPU (Central Processing Unit), MPU (Micro Processing Unit) etc.) and a storage device (RAM (Random Access Memory), ROM (Read Only Memory) etc.).

The control signal generating circuit 101 generates diphase control signals φ1, φ2 to be respectively supplied to the gate drivers G1, G2. Specifically, the control signal generating circuit 101 generates the control signals φ1, φ2 according to the later described duty ratio control signal which is input from the duty ratio control circuit 102. The control signals φ1, φ2 in the present embodiment are assumed to be diphase (high level, low level) square-waves (e.g., PWM (Pulse Width Modulation) pulses) of a predetermined duty ratio.

The duty ratio control circuit 102 generates signals (hereinafter called duty ratio control signals) for controlling the control signals φ1, φ2 generated by the control signal generating circuit 101 and inputs the generated duty ratio control signals to the control signal generating circuit 101. The duty ratio control circuit 102 generates the duty ratio control signals so that the voltages between the power storage cells B1, B2 are appropriately equalized in view of improving the speed, safety, efficiency and the like according to, for example, the voltages of the power storage cells B1, B2 obtained from the measurements of the measuring circuit 103.

The measuring circuit 103 obtains the real time measurements of the voltages (e.g., voltage between the connection points J4 and J2, voltage between the connection points J2 and J7 etc.) at a predetermined part of the line which configures the balance correction circuit 1 and transmits the measurements obtained to the control signal generating circuit 101 and the duty ratio control circuit 102.

Next, description on the basic operations of the balance correction circuit 1 configured as described above will be given with reference to FIG. 2.

Figure 2:
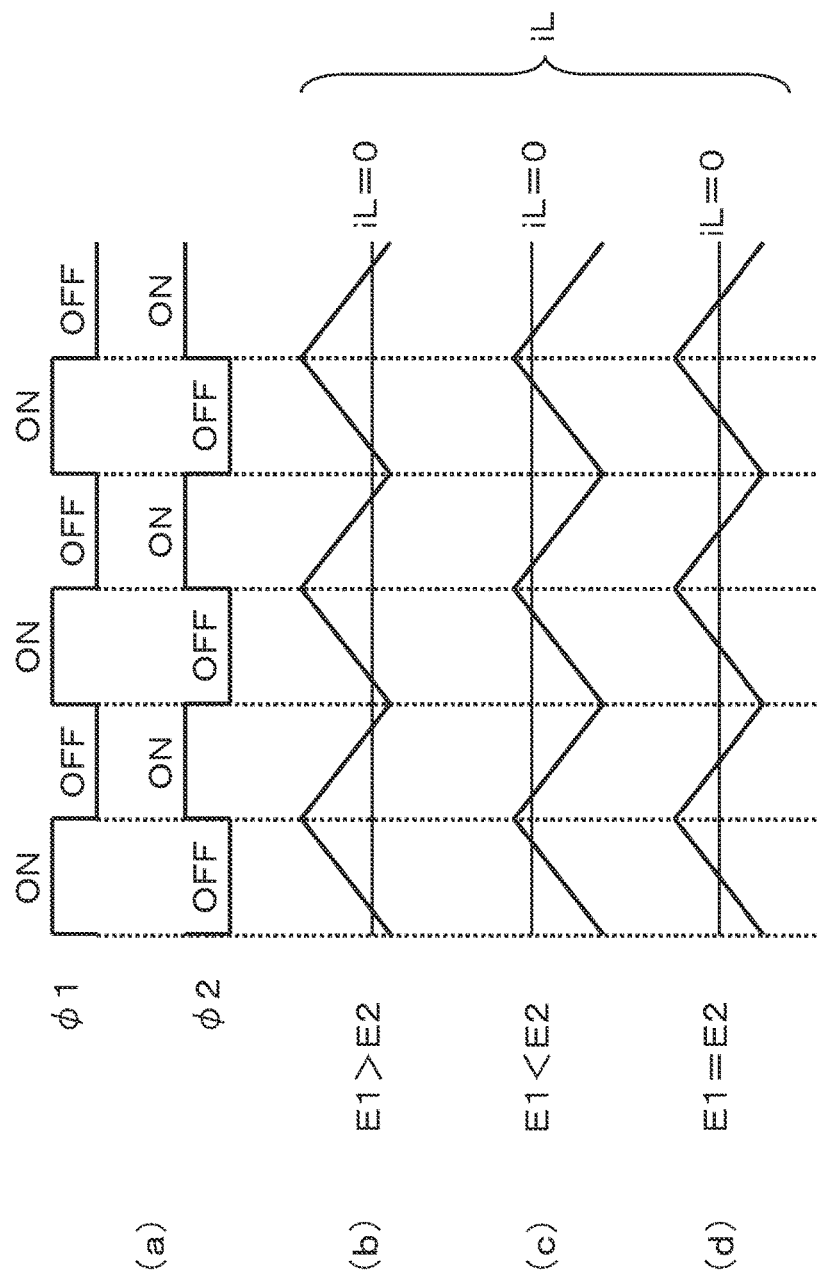
FIG. 2 illustrates in (a) a waveform of the control signals $\varphi 1$, $\varphi 2$ output by the control circuit 10 during the first period and (b) to (d) waveforms of currents flowing through the inductor L during the first period.

In FIG. 2, (a) shows the waveform of the control signals φ1, φ2 which are generated during the period when the on/off control of the switching elements S1, S2 are performed by the control circuit 10. During the above period, the control circuit 10 generates, for example, the control signals φ1, φ2 which are configured of square-waves formed by complementarily turning on/off at the same cycle.

In FIG. 2, (b) to (d) show the waveforms of the currents iL which flow through the inductor L (hereinafter also called the regeneration circuit) during the on/off control period of the switching elements S1, S2. Among them, (b) shows the waveform of the current iL which flows through the inductor L when the voltage E1 of the power storage cell B1 is higher than the voltage E2 of the power storage cell B2, (c) shows the waveform of the current iL which flows through the inductor L when the voltage E1 of the power storage cell B1 is lower than the voltage E2 of the power storage cell B2, and (d) shows the waveform of the current iL which flows through the inductor L when the voltage E1 of the power storage cell B1 and the voltage E2 of the power storage cell B2 are equal (substantially equal.)

As shown in (b) of FIG. 2, when the voltage E1 of the power storage cell B1 is higher than the voltage E2 of the power storage cell B2 (E1>E2), a current iL mainly flows along a path (hereinafter called the first path) from the cathode of the power storage cell B1→the connection point J5→the connection point J4→the switching element S1→the connection point J3→the inductor L→the connection point J2→the connection point J1→and to the anode of the power storage cell B1 while the switching element S1 is turned on and the switching element S2 is turned off. That is, during this period, the current iL mainly flows in the direction shown with the solid arrow indicated in FIG. 1 to have energy stored in the inductor L.

Thereafter, when the switching element S1 is turned off and the switching element S2 is turned on, the energy stored in the inductor L is discharged along the path from the inductor L→the connection point J2→the connection point J1→the cathode of the power storage cell B2→the anode of the power storage cell B2→the connection point J6→the connection point J7→the switching element S2→the connection point J3→and to the inductor L to hereby charge the power storage cell B2. And when the energy in the inductor L is exhausted, the current iL starts flowing toward the opposite direction (the direction shown with a dashed arrow in FIG. 1) in the inductor L.

As shown in (c) of FIG. 2, when the voltage E1 of the power storage cell B1 is lower than the voltage E2 of the power storage cell B2 (E1<E2), a current iL mainly flows along a path (hereinafter called the second path) from the cathode of the power storage cell B2→the connection point J1→the connection point J2→the inductor L→the connection point J3→the switching element S2→the connection point J7→the connection point J6→and to the anode of the power storage cell B2 while the switching element S1 is turned off and the switching element S2 is turned on. That is, during this period, the current iL mainly flows in the direction shown with the dashed arrow indicated in FIG. 1 to have energy stored in the inductor L.

Thereafter, when the switching element S2 is turned off and the switching element S1 is turned on, the energy stored in the inductor L is discharged along the path from the inductor L→the connection point J3→the switching element S1→the connection point J4→the connection point J5→the cathode of the power storage cell B1→the anode of the power storage cell B1→the connection point J1→the connection point J2→and to the inductor L to hereby charge the power storage cell B1. And when the energy in the inductor L is exhausted, the current iL starts flowing toward the opposite direction (the direction shown with a solid arrow in FIG. 1) in the inductor L.

Hereby, when there is a difference between the voltages of the power storage cells B1, B2, energy is exchanged between the power storage cell B1 and the power storage cell B2 by the current iL alternatively flowing through the first path and the second path to equalize the voltages of the two and ensuring a cell balance as a result. As shown in (d) of FIG. 2, when the voltage E1 of the power storage cell B1 and the voltage E2 of the power storage cell B2 are equal (E1=E2), the tradeoff of the energy exchanged between the power storage cells B1, B2 is balanced along with the on/off control of the switching elements S1, S2 so that the voltages of the power storage cells B1, B2 are maintained equal.

The control circuit 10 performs realtime monitoring of the voltages (voltage between the respective terminals of the power storage cells B1, B2, for example, the voltage between the connection points J4 and J2, voltage between the connection points J2 and J7) measured with the measuring circuit 103, and stops the on/off control of the switching elements S1, S2 upon detecting that the voltages of the power storage cells B1, B2 are equal (substantially equal.)

Here, the control circuit 10 may control the duty ratio of the control signals φ1, φ2 according to, for example, the voltage values of the power storage cells B1, B2 obtained from the measurements of the measuring circuit 103 so that the voltages between the power storage cells B1, B2 are appropriately equalized in view of improving the speed, safety, efficiency and the like.

<In a Case of Three or More Power Storage Cells>

The configuration of the balance correction circuit 1 described above can be extended for a case where there are three of more power storage cells.

Figure 3:
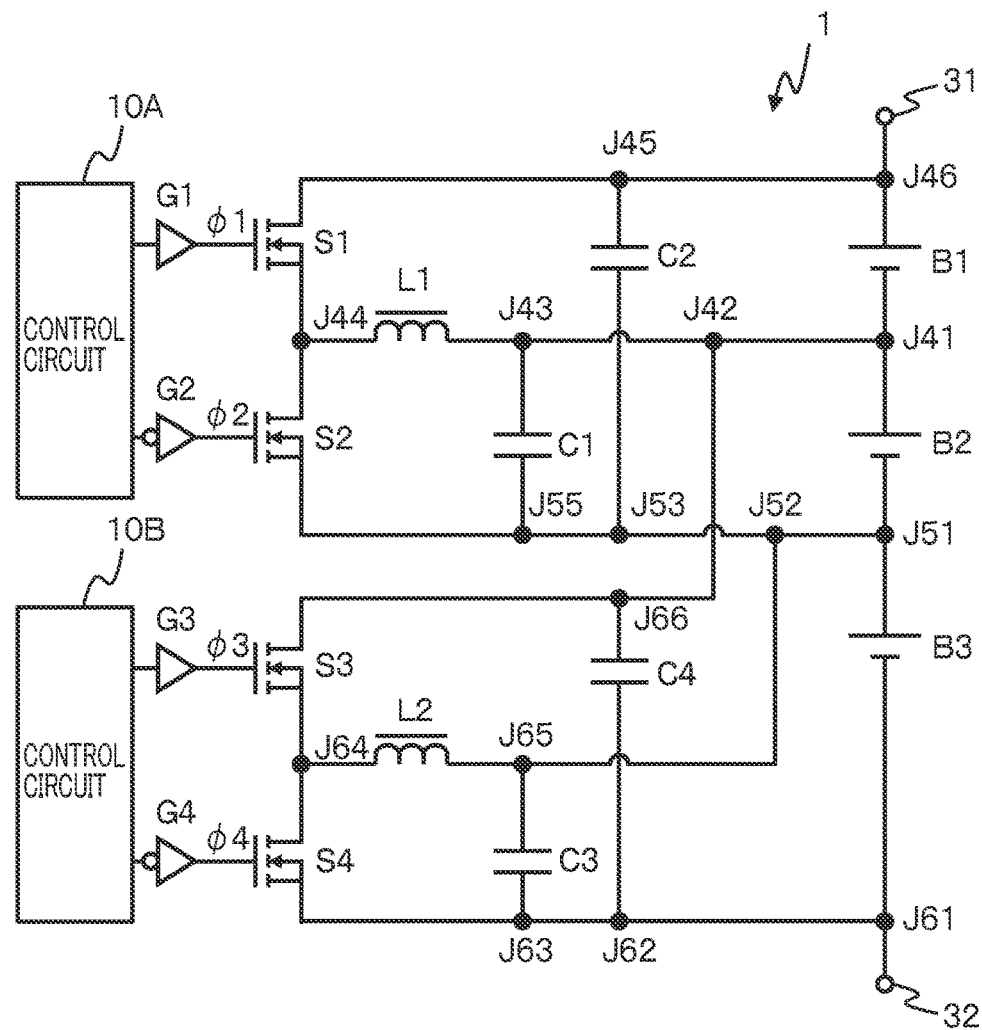
FIG. 3 illustrates an example of a balance correction circuit adapted to equalize the voltages of three power storage cells B1 to B3.

FIG. 3 illustrates an example of a balance correction circuit 1 adapted to equalize the voltages of three power storage cells B1 to B3. As shown in FIG. 3, this balance correction circuit 1 includes a circuit (hereinafter this circuit is also called the first balance correction unit) configured to include the control circuit 10A, the gate drivers G1, G2, the switching elements S1, S2, the inductor L1 and the capacitive elements C1, C2 to control the charge/discharge of the power storage cells B1, B2, and a circuit (hereinafter this circuit is also called the second balance correction unit) configured to include the control circuit 10B, the gate drivers G3, G4, the switching elements S3, S4, the inductor L2 and the capacitive elements C3, C4 to control the charge/discharge of the power storage cells B2, B3.

In FIG. 3, the control circuit 10A complementarily turns on/off the switching elements S1, S2 to equalize the voltages of the power storage cells B1 and B2, and the control circuit 10B complementarily turns on/off the switching elements S3, S4 to equalize the voltages of the power storage cells B2 and B3. Such control allows the voltage of the power storage cell B2 to be equal to the voltages of both of the two power storage cells B1, B3 and as a result the voltages of the three power storage cells B1, B2 and B3 are equalized.

In FIG. 3, the capacitive elements C1 to C4 are all provided for the purpose of reducing the noise generated due to the on/off operations of the switching elements S1 to S4 and relaxing the voltage variation generated to each of the power storage cells B1 to B3.

Figure 4:
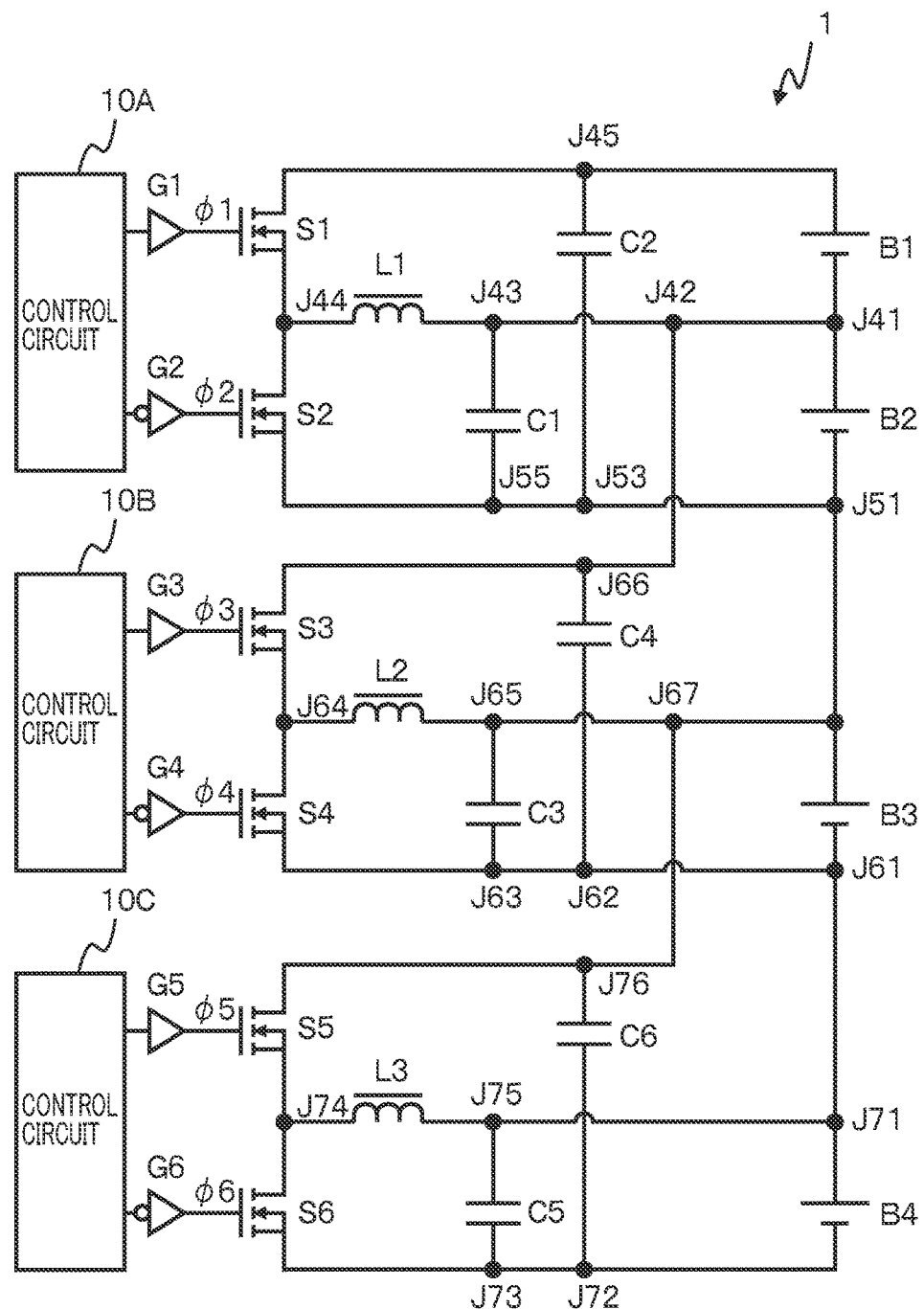
FIG. 4 illustrates an example of a balance correction circuit adapted to equalize the voltages of four power storage cells B1 to B4.

FIG. 4 illustrates an example of a balance correction circuit 1 adapted to equalize the voltages of the four power storage cells B1 to B4. As shown in FIG. 4, this balance correction circuit 1 includes a circuit (hereinafter this circuit is also called the first balance correction unit) configured to include the control circuit 10A, the gate drivers G1, G2, the switching elements S1, S2, the inductor L1 and the capacitive elements C1, C2 to control the charge/discharge of the power storage cells B1, B2, a circuit (hereinafter this circuit is also called the second balance correction unit) configured to include the control circuit 10B, the gate drivers G3, G4, the switching elements S3, S4, the inductor L2 and the capacitive elements C3, C4 to control the charge/discharge of the power storage cells B2, B3, and a circuit (hereinafter this circuit is also called the third balance correction unit) configured to include the control circuit 10C, the gate drivers G5, G6, the switching elements S5, S6, the inductor L3 and the capacitive elements C5, C6 to control the charge/discharge of the power storage cells B3, B4.

In FIG. 4, the control circuit 10A complementarily turns on/off the switching elements S1, S2 to equalize the voltages of the power storage cells B1 and B2, the control circuit 10B complementarily turns on/off the switching elements S3, S4 to equalize the voltages of the power storage cells B2 and B3, and the control circuit 10C complementarily turns on/off the switching elements S5, S6 to equalize the voltages of the power storage cells B3 and B4. Such control allows the voltage of the power storage cell B2 to be equal to the voltages of both of the two power storage cells B1, B3 and allows the voltage of the power storage cell B3 to be equal to the voltages of both of the two power storage cells B2, B4, and as a result the voltages of the four power storage cells B1, B2, B3 and B4 are equalized.

In FIG. 4, the capacitive elements C1 to C6 are all provided for the purpose of reducing the noise generated due to the on/off operations of the switching elements S1 to S6 and relaxing the voltage variation generated to each of the power storage cells B1 to B4.

<Issues Arising from Parallel Control>

In the balance correction circuit 1 shown in FIG. 3 or FIG. 4, each control circuit 10 (10A to 10C) can be operated independently, and also an on/off control of the switching element with one control circuit 10 can be performed in parallel with the on/off control of the switching element with another control circuit 10 (hereinafter this control will be called parallel control.)

However, when the frequencies of the control signals input (imparted to the gate of the switching element) to the switching element are not synchronized when the control circuits 10A, 10B and 10C control the on/off of the switching elements, there is a possibility of issues arising when performing the aforementioned parallel control. In other words, for example, a disordered voltage waveform which includes multiple frequency components and which is unstable with respect to time would appear to the connection point J42 in the case of FIG. 3 and to the connection points J42, J67 in the case of FIG. 4 so that issues of disturbance and noise, abnormality in the regenerated current, abnormality in oscillation being generated and the like would arise. Specific configurations for preventing such issues will be described in the following.

First Embodiment

Figure 5:
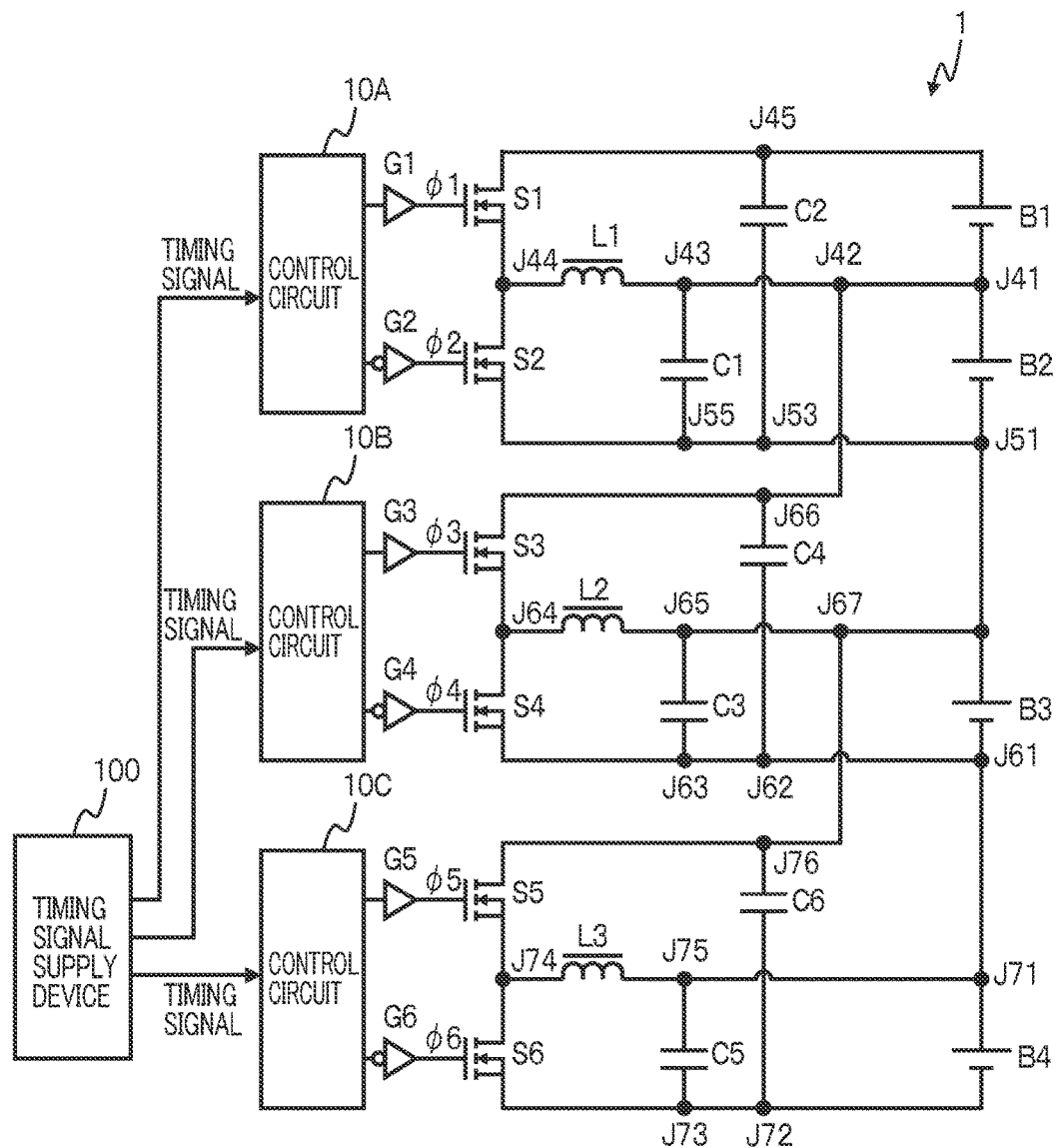
FIG. 5 illustrates a balance correction circuit 1 shown as the first embodiment.

FIG. 5 illustrates a balance correction circuit 1 shown as the first embodiment. This balance correction circuit 1 is configured with, as the basis, a balance correction circuit 1 adapted to equalize the voltages of the four power storage cells B1 to B4 shown in FIG. 4.

In this balance correction circuit 1, the common timing signals (e.g., square-wave clock signal generated by an oscillator circuit and the like) generated in the timing signal supply device 100 (timing signal supply unit) is directly supplied to the control circuits 10A to 10C and the control circuits 10A to 10C generate the control signals φ1 to φ6 for on/off control of the switching elements S1 to S6 which are respectively the control targets based on the common timing signal supplied from the timing signal supply device 100. The timing signal supply device 100 is configured with, for example, a microcomputer, an oscillator circuit, a clock generator and the like, however, the timing signal supply device 100 may be configured as a part of any one of the control circuits 10.

The balance correction circuit 1 in this way has each of the control circuits 10A to 10C generate the control signals φ1 to φ6 based on a common timing signal directly supplied from the same timing signal supply device 100 so that the control signals generated by the control circuits 10A to 10C are precisely synchronized and thus the above mentioned issues are prevented from occurring.

Figure 6:
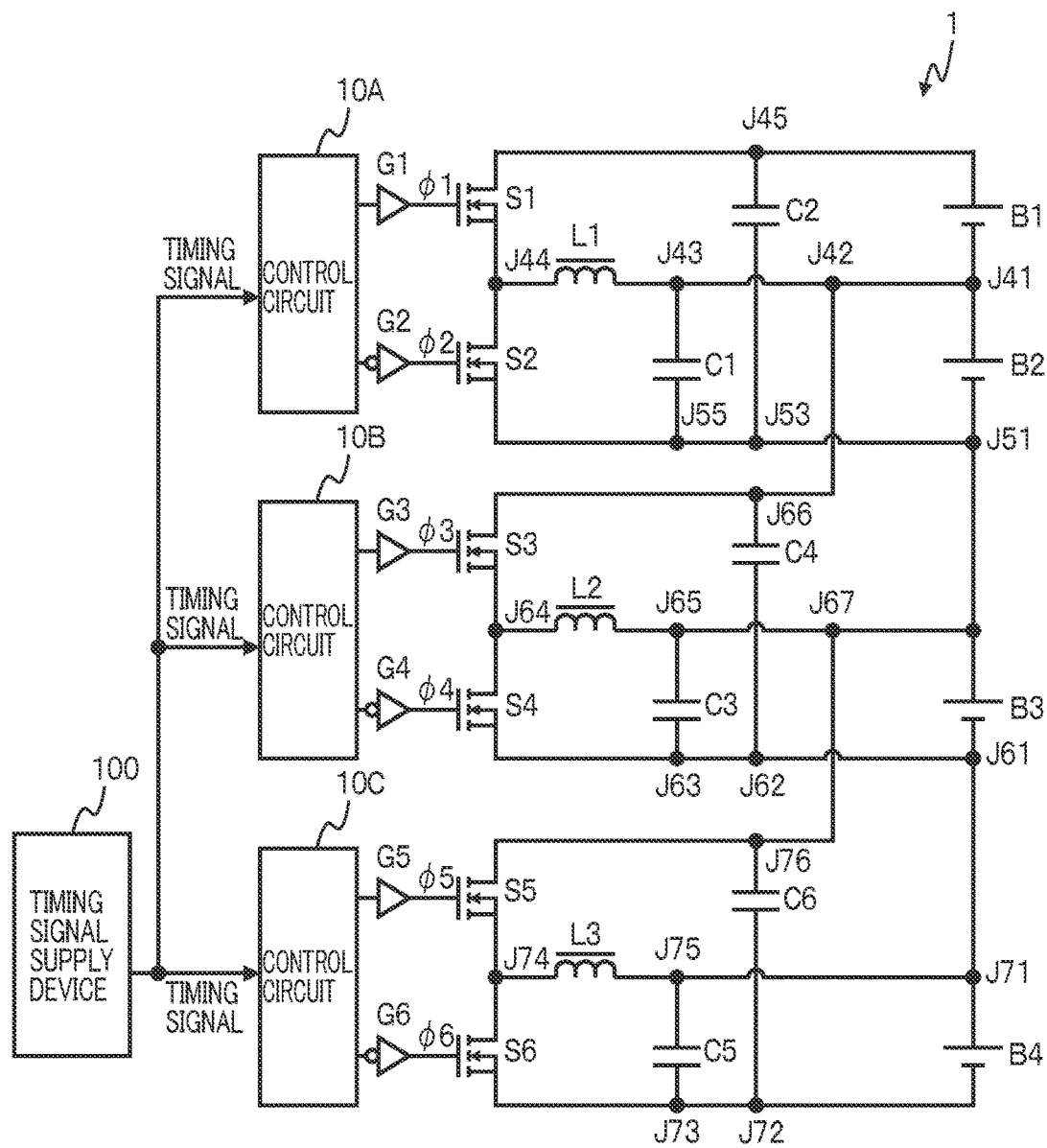
FIG. 6 illustrates a modified example of the balance correction circuit 1 shown as the first embodiment.
Figure 7:
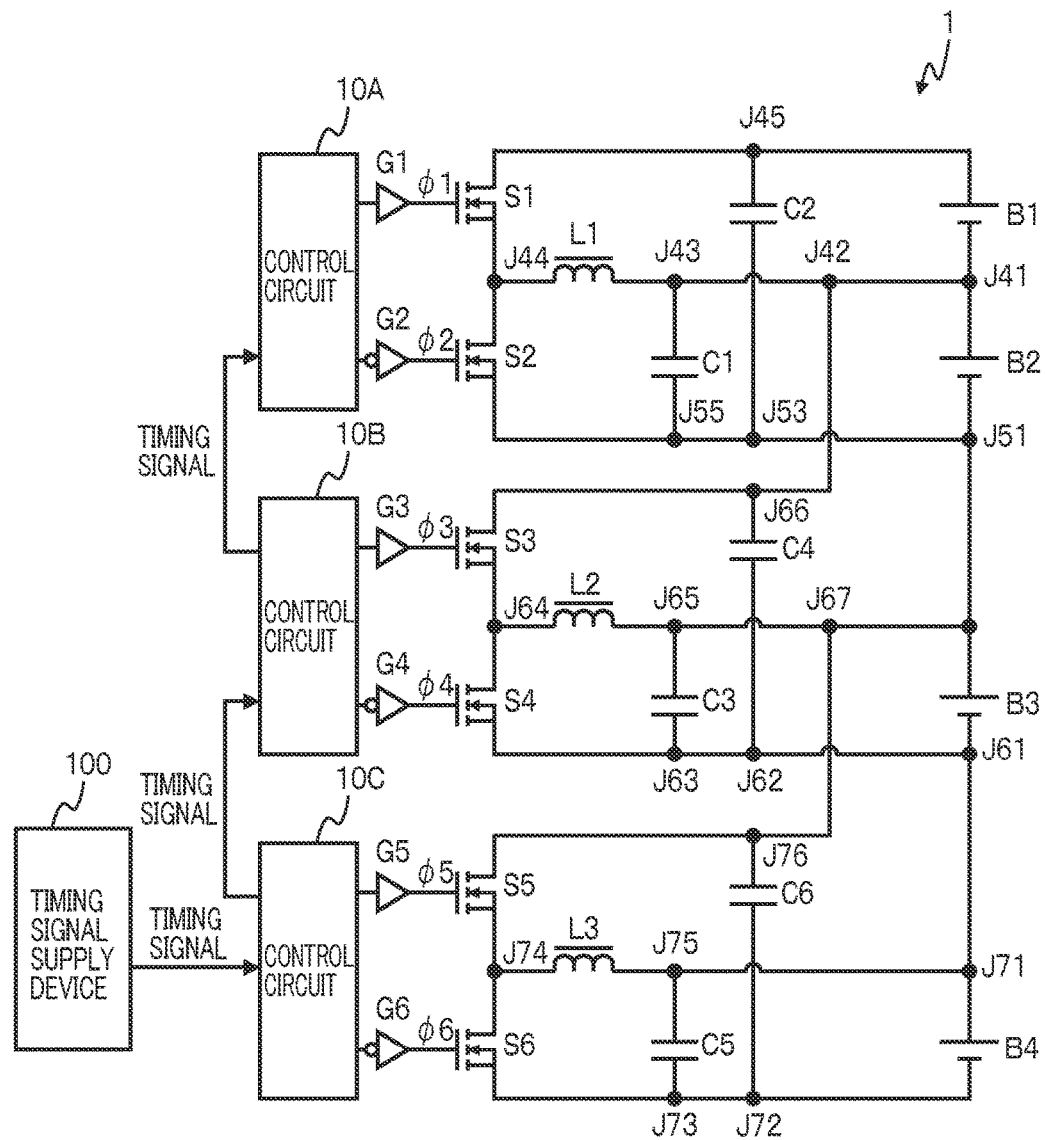
FIG. 7 illustrates a modified example of the balance correction circuit 1 shown as the first embodiment.

FIGS. 6 and 7 illustrate modified examples of the balance correction circuit 1 shown in FIG. 5. In the balance correction circuit 1 shown in FIG. 6, the timing signal supply device 100 has supplied to the control circuits 10A to 10C the timing signals output from the same port by distributing with a common branch line commonly connected thereto. Further, as shown in FIG. 7, the balance correction circuit 1 has a timing signal directly supplied only to one control circuit 10 (control circuit 10C in FIG. 7) from the timing signal supply device 100, the timing signal supplied to this control circuit 10 from the control circuit 10 (control circuit 10C) is supplied to another control circuit (control circuit 10B in FIG. 7), and the timing signal supplied to this control circuit 10 from the control circuit (control circuit 10B) is supplied to yet another control circuit (control circuit 10A). In other words, the timing signal output from the timing signal supply device 100 is supplied to the control circuits 10A to 10C in a so-called bucket brigade manner. When the circuit configuration of FIG. 6 or FIG. 7 is adopted, the number of output ports required for the timing signal of the timing signal supply device 100 need to be only one so that the resources of the timing signal supply device 100 can be utilized effectively.

Second Embodiment

Figure 8:
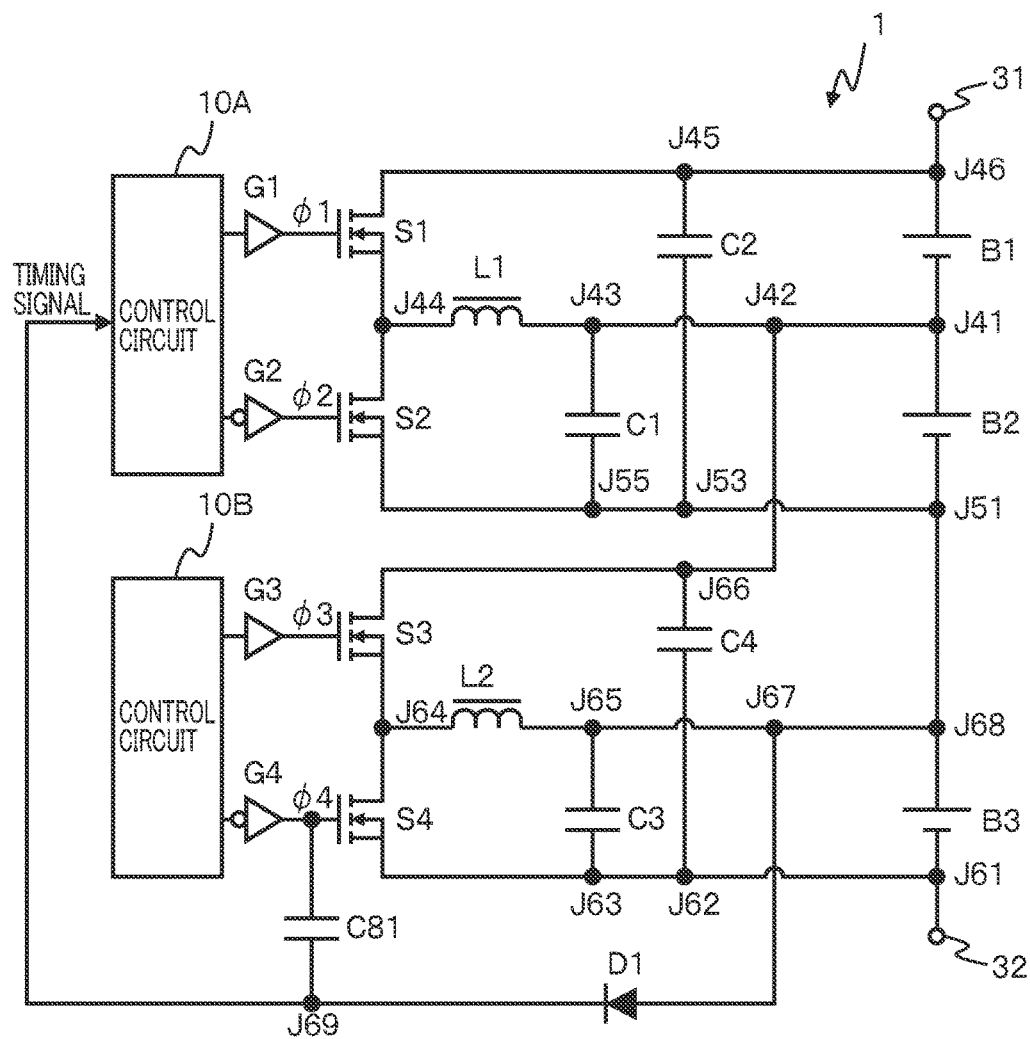
FIG. 8 illustrates a balance correction circuit 1 (in a case of three power storage cells) shown as the second embodiment.

FIG. 8 illustrates a balance correction circuit 1 shown as the second embodiment. This balance correction circuit 1 is configured with the balance correction circuit 1 adapted to equalize the voltages of three power storage cells B1 to B3 shown in FIG. 3, as the basis.

In this balance correction circuit 1, a timing signal is generated based on the control signal φ4 generated by the control circuit 10B of the second balance correction unit to be supplied to the control circuit 10A of the first balance correction unit. Specifically, the second balance correction unit generates the timing signals in the following manner.

As shown in FIG. 8, this balance correction circuit 1 has a capacitive element C81 provided between the supply line to the switching element S4 of the control signal φ4 of the second balance correction unit and the cathode (connection point J67) of the power storage cell B3. Further, a rectifying element D1 (diode etc.) which allows a current to pass only in the direction from the power storage cell B3 cathode to the power storage cell B3 cathode side terminal of the capacitive element C81 is provided between the power storage cell B3 cathode and the power storage cell B3 cathode side terminal (connection point J69 side terminal) of the capacitive element C81. And the power storage cell B3 cathode side terminal of the capacitive element C81 and the timing signal input terminal of the control circuit 10A are line connected so that the voltage at the power storage cell B3 cathode side terminal of the capacitive element C81 is supplied to the control circuit 10A as a timing signal.

In the above configuration, the capacitive element C81 is charged when the control signal φ4 is at a low level and the voltage of the power storage cell B3 cathode side terminal of the capacitive element C81 takes a value obtained by adding the power storage cell B3 cathode potential with the control signal φ4 voltage when the control signal φ4 is at a high level.

Figure 9:
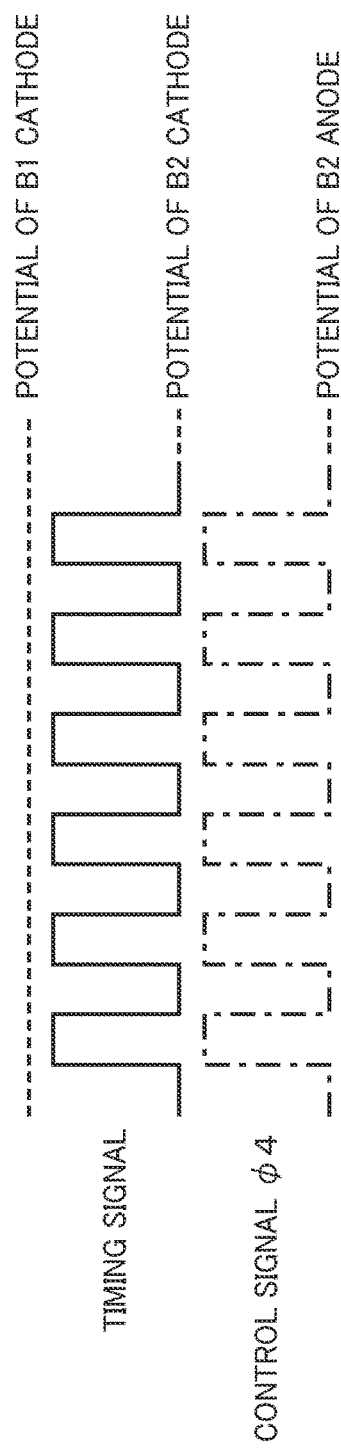
FIG. 9 illustrates an example of a voltage waveform of a control signal $\varphi 4$ and a voltage waveform of a timing signal provided to the control circuit 10A.

FIG. 9 exemplifies a waveform of the control signal φ4 and a waveform of a timing signal provided to the control circuit 10A. As shown in FIG. 9, the timing signal supplied to the control circuit 10A is in a waveform synchronizing with the control signal φ4. Further, as shown in FIG. 9, the timing signal is at a low level (potential of power storage cell B3 cathode) when the control signal φ4 is at a low level and the timing signal is at a high level (potential obtained by adding to the potential of the power storage cell B3 cathode with the voltage between the terminals of the capacitive element C81 charged by the control signal φ4) when the control signal φ4 is at a high level. The specific mechanism of the control circuit 10A generating the control signals φ1, φ2 based on the timing signal will be described later.

Figure 10:
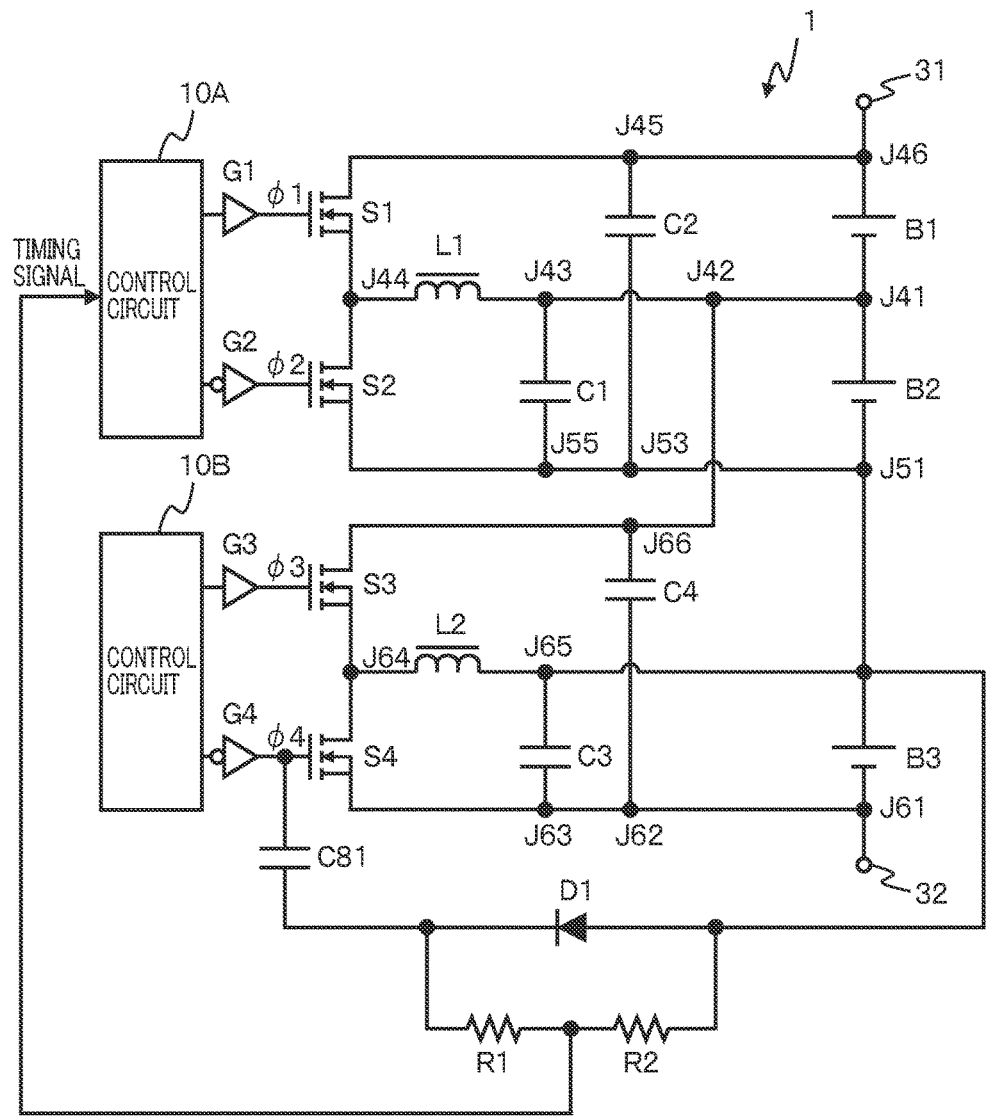
FIG. 10 illustrates a modified example of the balance correction circuit 1 shown as the second embodiment.

The control circuit 10A of the first balance correction unit generates the control signals φ1, φ2 by synchronizing with the timing signals supplied from the second balance correction unit as described above. And when there is a need to adjust the voltage level of the timing signal, for example, as shown in FIG. 10, only the voltage obtained by dividing the voltage between the terminals of the rectifying element D1 with the resistive elements R1, R2 has to be supplied to the control circuit 10A as a timing signal.

Figure 11:
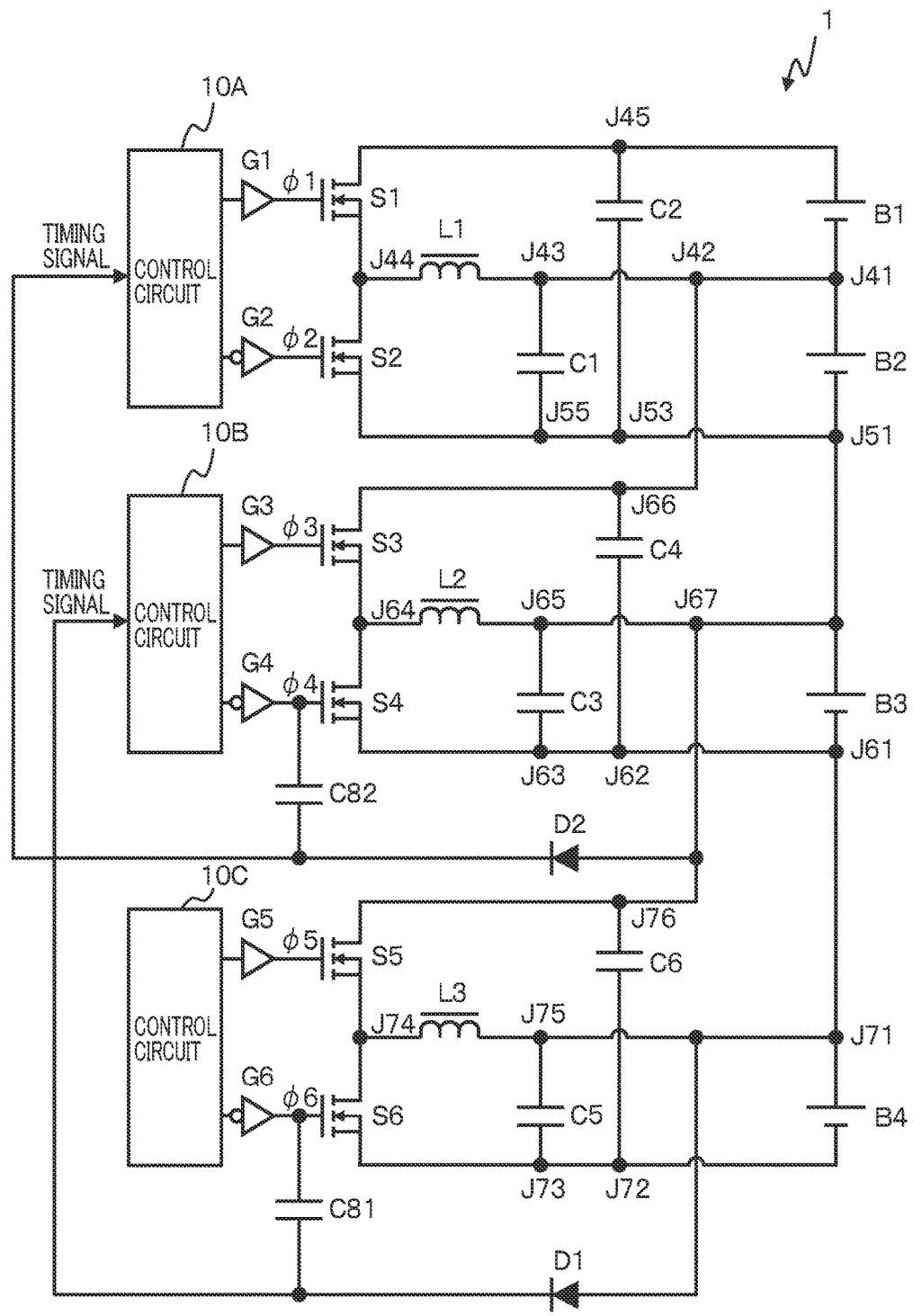
FIG. 11 illustrates a balance correction circuit 1 (in a case of four power storage cells) shown as the second embodiment.

A similar mechanism can be extended to the balance correction circuit 1 which is adapted for a case including four or more power storage cells. FIG. 11 illustrates an example of a case where the mechanism is applied to a balance correction circuit 1 adapted to equalize the voltages of the four power storage cells B1 to B4. This balance correction circuit 1 is configured using the balance correction circuit 1 shown in FIG. 1 as the basis.

As shown in FIG. 11, in this balance correction circuit 1, a timing signal is generated based on the control signal φ6 generated by the control circuit 10C of the third balance correction unit to be supplied to the control circuit 10B of the second balance correction unit. Further, a timing signal is generated based on the control signal φ4 generated by the control circuit 10B of the second balance correction unit based on the above described timing signal for supply to the control circuit 10A of the first balance correction unit.

Figure 12:
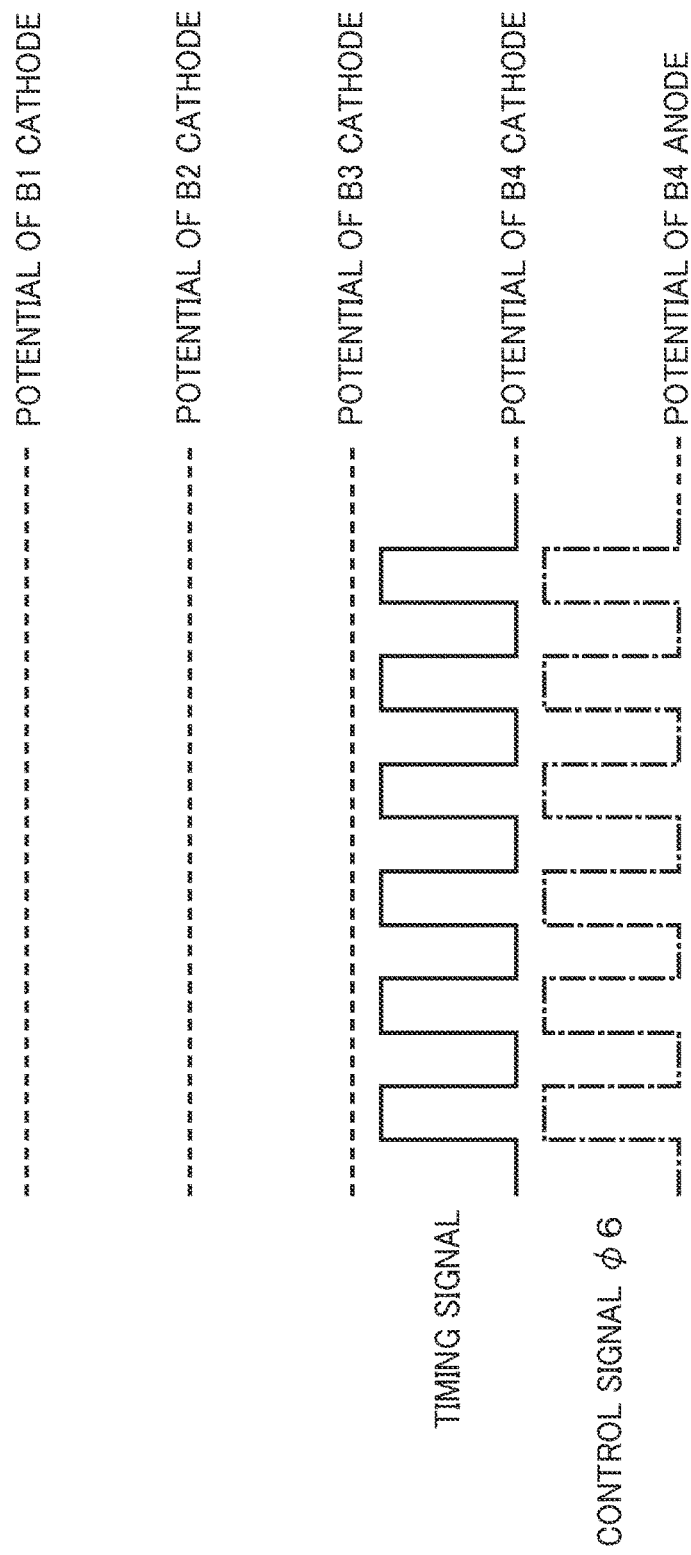
FIG. 12 illustrates an example of a voltage waveform of a control signal $\varphi 6$ and a voltage waveform of a timing signal provided to the control circuit 10B.

FIG. 12 illustrates an example of a waveform of a control signal φ6 and a waveform of a timing signal supplied to the control circuit 10B. As shown in FIG. 12, the timing signal supplied to the control circuit 10B is in a waveform synchronizing with the control signal φ6. Further, as shown in FIG. 12, the timing signal is at a low level (potential of power storage cell B4 cathode) when the control signal φ6 is at a low level and the timing signal is at a high level (potential obtained by adding to the potential of power storage cell B4 cathode the voltage between terminals of the capacitive element C81 charged by the control signal φ6) when the control signal φ6 is at a high level.

Figure 13:
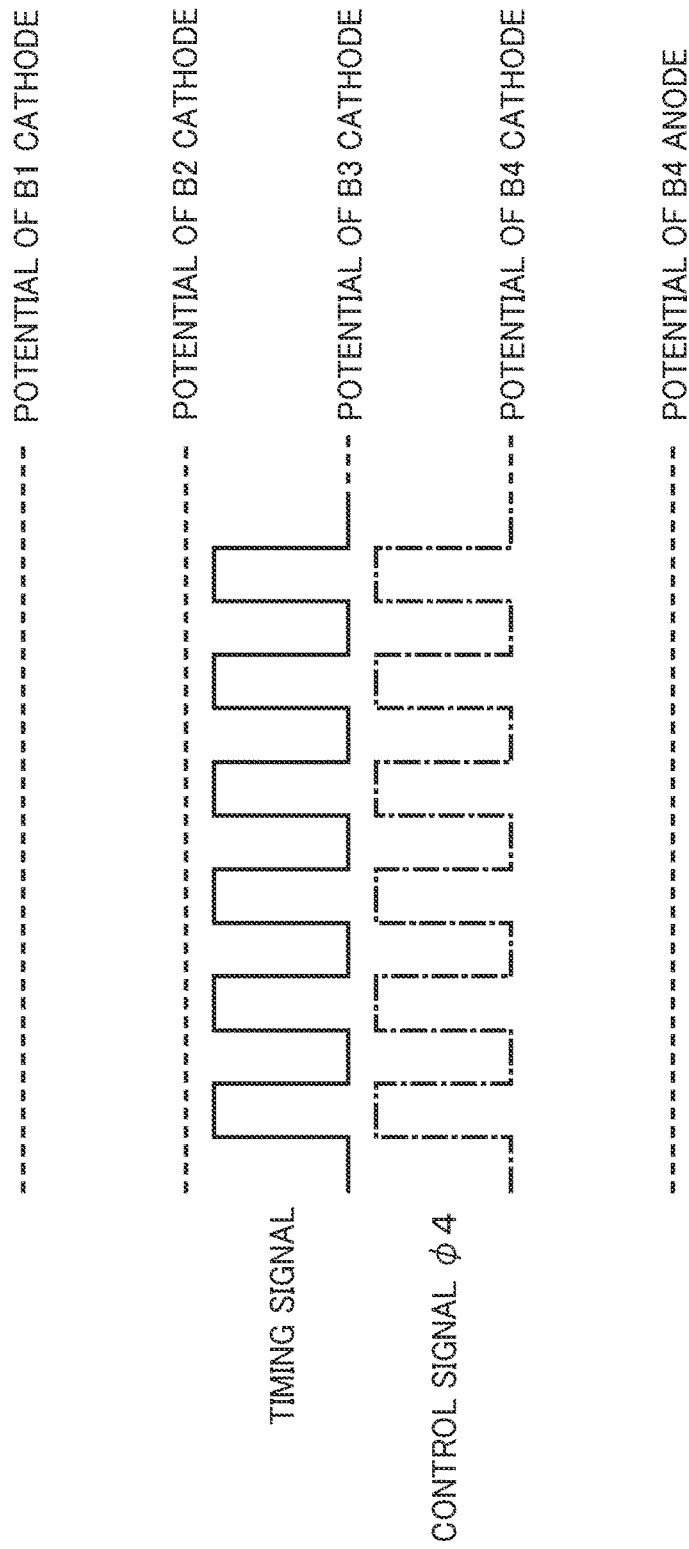
FIG. 13 illustrates an example of a voltage waveform of the control signal $\varphi 4$ and a voltage waveform of the timing signal provided to the control circuit 10A.

FIG. 13 exemplifies a waveform of a control signal φ4 and a waveform of a timing signal supplied to the control circuit 10A. As shown in FIG. 13, the timing signal supplied to the control circuit 10A is in a waveform synchronizing with the control signal φ4. Further, as shown in FIG. 13, the timing signal is at a low level (potential of power storage cell B3 cathode) when the control signal φ4 is at a low level and the timing signal is at a high level (potential obtained by adding to the potential of the power storage cell B3 cathode the voltage between the terminals of the capacitive element C82 charged by the control signal φ4) when the control signal φ4 is at a high level. The specific mechanism of the control circuit 10A generating the control signals φ1, φ2 based on the timing signal will be described later.

The control circuit 10B of the second balance correction unit generates the control signals φ3, φ4 while allowing synchronization with the timing signals supplied from the third balance correction unit as described above. And the control circuit 10A of the first balance correction unit generates the control signals φ1, φ2 while allowing synchronization with the timing signals supplied from the second balance correction unit as described above.

And when there is a need to adjust the voltage level of the timing signal, similar to the case of the balance correction circuit 1 which is adapted for a case including three power storage cells, only the voltage obtained by dividing the voltage between the terminals of the rectifying element D1 (or rectifying element D2) has to be supplied to the control circuit 10B (or control circuit 10A) as a timing signal.

As described above, the control signals can be precisely synchronized between or among the control circuits 10 according to the balance correction circuit 1 of the second embodiment since a timing signal generated based on a control signal generated by the control circuit 10 of one balance correction unit is supplied to the control circuit 10 of another balance correction unit for the another balance correction unit to generate a control signal based on this timing signal. Therefore, the aforementioned issues arising from the control signals not being synchronized can be prevented.

Third Embodiment

Figure 14:
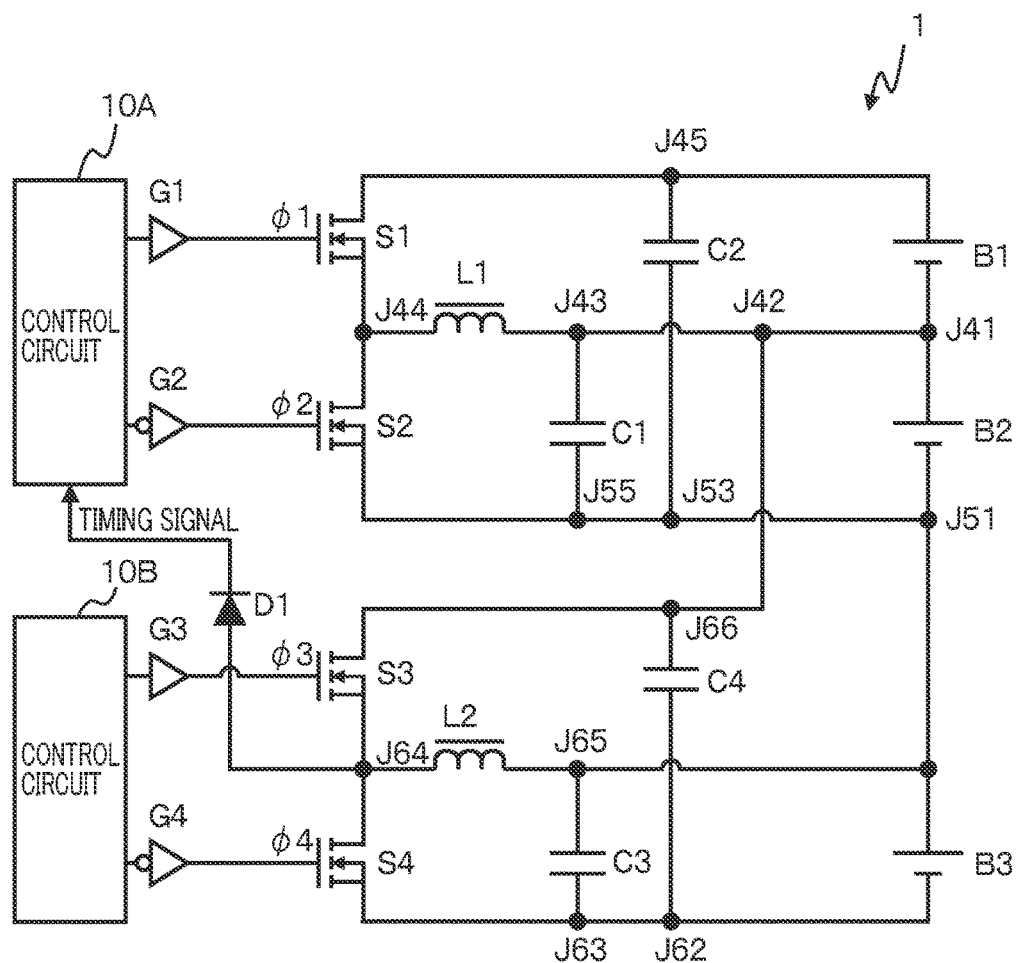
FIG. 14 illustrates a balance correction circuit 1 (in a case of three power storage cells) shown as the third embodiment.

FIG. 14 illustrates a balance correction circuit 1 shown as the third embodiment. This balance correction circuit 1 is configured with a balance correction circuit 1 adapted to equalize the voltages of the three power storage cells B1 to B3 shown in FIG. 3, as the basis.

In this balance correction circuit 1, timing signals are generated based on the control signals φ3, φ4 generated by the control circuit 10B of the second balance correction unit to be supplied to the control circuit 10A of the first balance correction unit. Specifically, in this balance correction circuit 1, the voltage at the common connection point J64 (line including the common connection point) among the switching element S1, the switching element S2 and the inductor L2 of the control circuit 10B in the second balance correction unit is supplied to the control circuit 10A via the rectifying element D1 (diode etc.)

Figure 15:
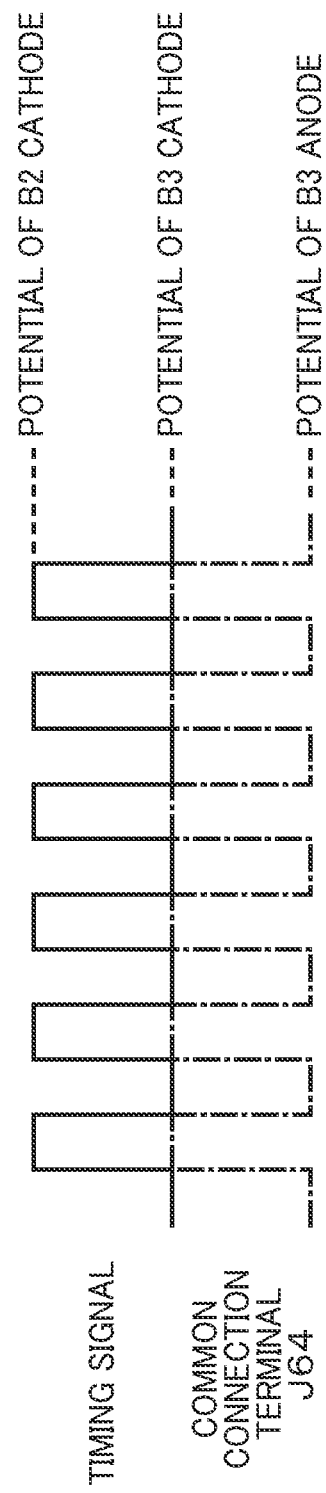
FIG. 15 illustrates an example of a voltage waveform at a common connection point J64 of the second balance correction unit and a voltage waveform of a timing signal provided to the control circuit 10A.

FIG. 15 exemplifies a waveform at a common connection point J64 and a waveform of a timing signal supplied to the control circuit 10A. As shown in FIG. 15, the timing signal supplied to the control circuit 10A is in a waveform synchronizing with the waveform at the common connection point J64, that is, a waveform synchronizing with the control signals φ3, φ6. Further, as shown in FIG. 15, the timing signal is at a low level (potential of power storage cell B3 cathode) when the waveform at the common connection point J64 is at a low level and the timing signal is at a high level (potential of power storage cell B2 cathode) when the waveform at the common connection point J64 is at a high level.

Figure 16:
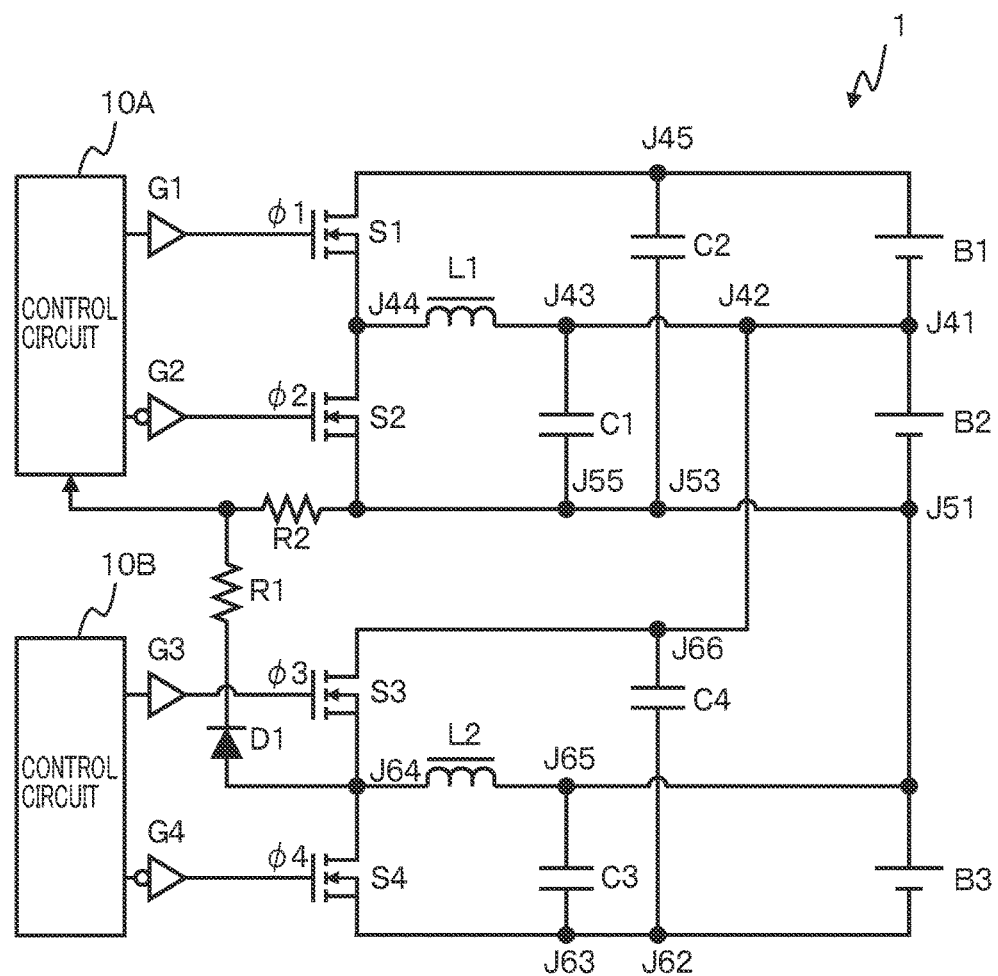
FIG. 16 illustrates a modified example of the balance correction circuit 1 shown as the third embodiment.

The control circuit 10A of the first balance correction unit generates the control signals φ1, φ2 by allowing synchronization with the timing signals supplied from the second balance correction unit as described above. And when there is a need to adjust the voltage level of the timing signal depending on the configuration of the control circuit 10A side, for example as shown in FIG. 16, the voltage level just has to be adjusted by inserting in series a resistive element R1 between the common connection point J64 and the timing signal input terminal of the control circuit 10A as well as inserting a resistive element R2 between the power storage cell B3 cathode and the timing signal input terminal of the control circuit 10A.

Figure 17:
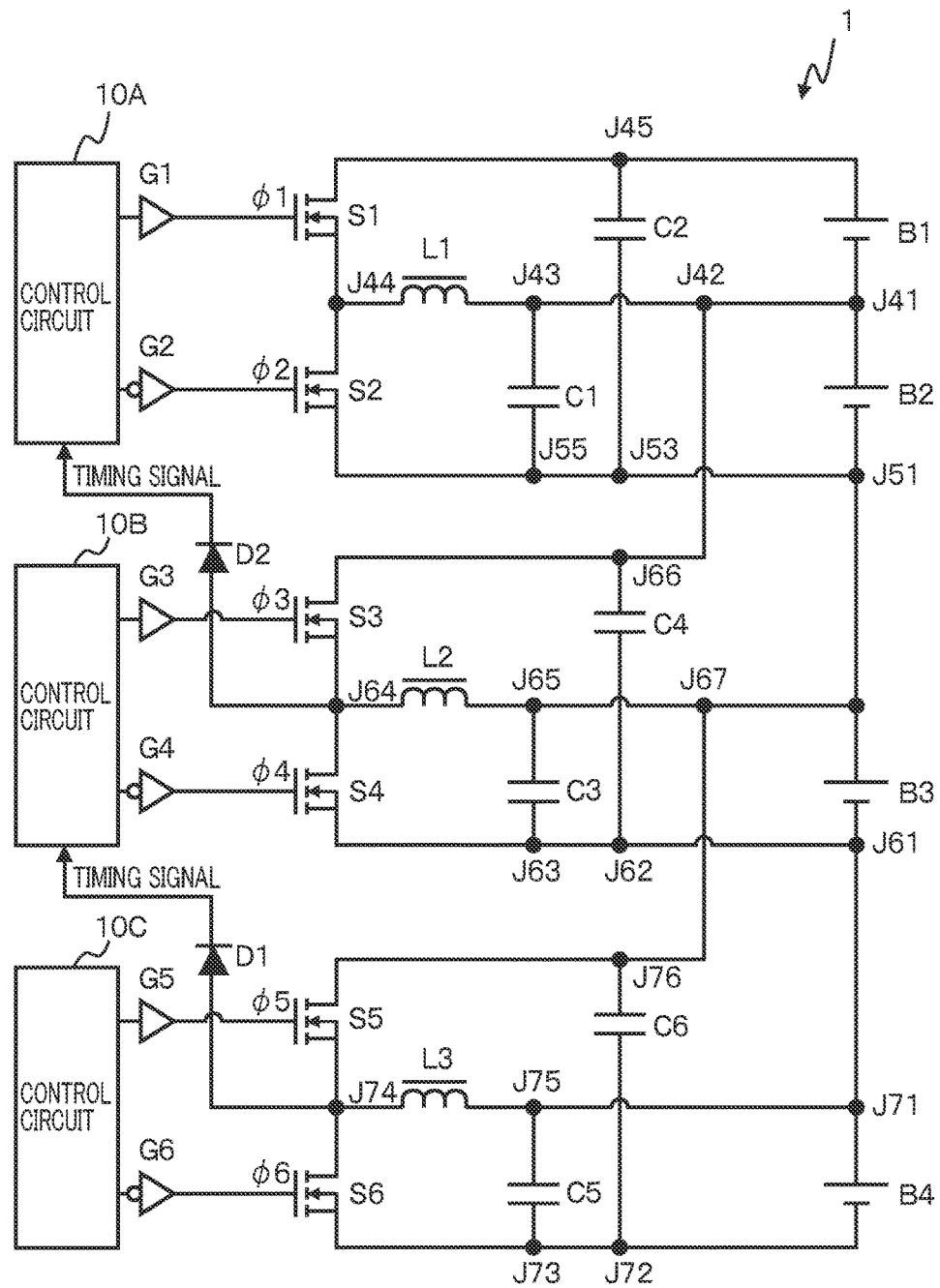
FIG. 17 illustrates a balance correction circuit 1 (in a case of four power storage cells) shown as the third embodiment.

A similar mechanism can be extended to the balance correction circuit 1 which is adapted for a case including four or more power storage cells. FIG. 17 illustrates an example of a case where the mechanism is applied to a balance correction circuit 1 adapted to equalize the voltages of the four power storage cells B1 to B4. This balance correction circuit 1 is configured with the balance correction circuit 1 shown in FIG. 4 as the basis.

As shown in FIG. 17, in this balance correction circuit 1, a timing signal is generated based on the control signals φ5, φ6 generated by the control circuit 10C of the third balance correction unit to be supplied to the control circuit 10B of the second balance correction unit. Further, a timing signal is generated based on the control signals φ3, φ4 generated by the control circuit 10B of the second balance correction unit based on the above described timing signal supplied from the third balance correction unit to supply to the control circuit 10A of the first balance correction unit.

Figure 18:
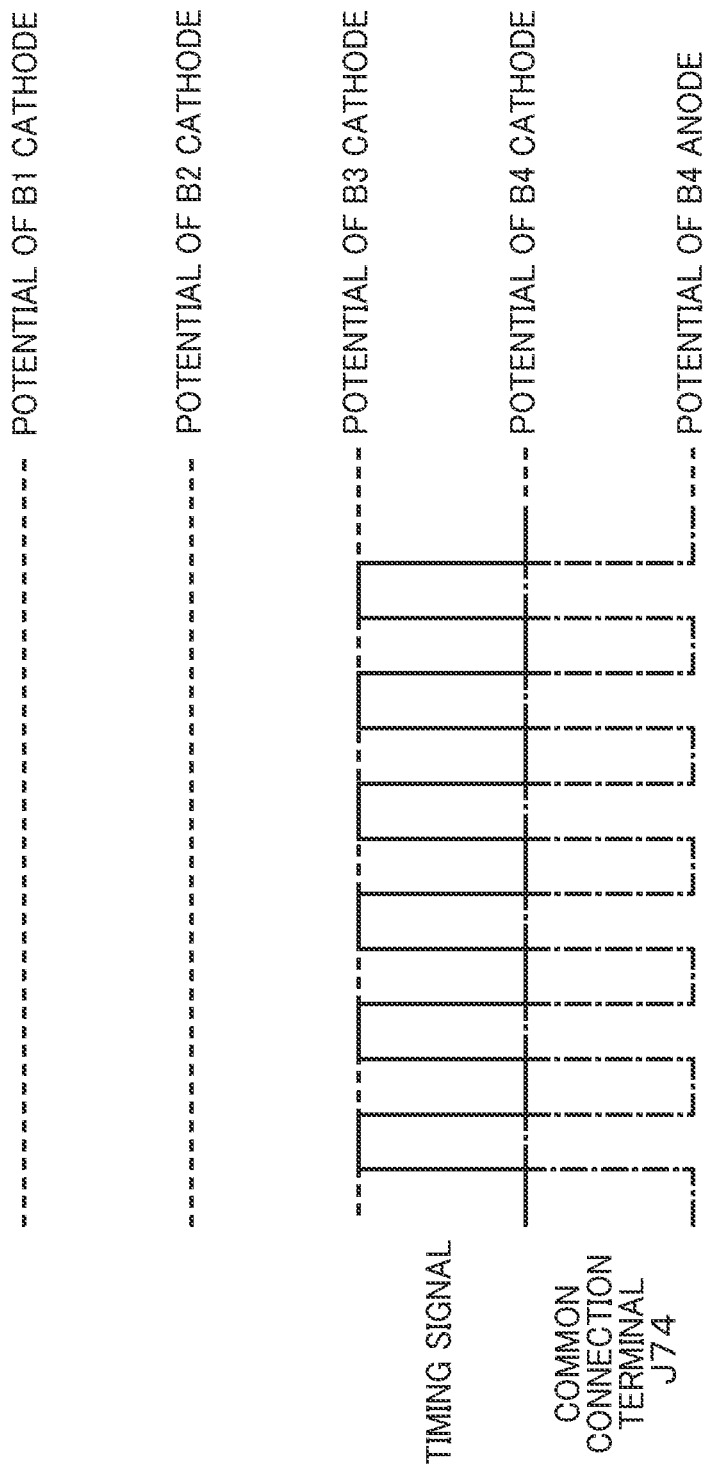
FIG. 18 illustrates an example of a voltage waveform of a control signal $\varphi 6$ and a voltage waveform of a timing signal provided to the control circuit 10B.

FIG. 18 illustrates an example of a waveform at the common connection point J74 and a waveform of a timing signal supplied to the control circuit 10B. As shown in FIG. 18, the timing signal supplied to the control circuit 10B is in a waveform synchronizing with the waveform at the common connection point J74, that is, in a waveform synchronizing with the control signals φ5, φ6. Further, as shown in FIG. 18, the timing signal is at a low level (potential of power storage cell B4 cathode) when the waveform at the common connection point J74 is at a low level and the timing signal is at a high level (potential of power storage cell B4 cathode) when the waveform at the common connection point J74 is at a high level.

Figure 19:
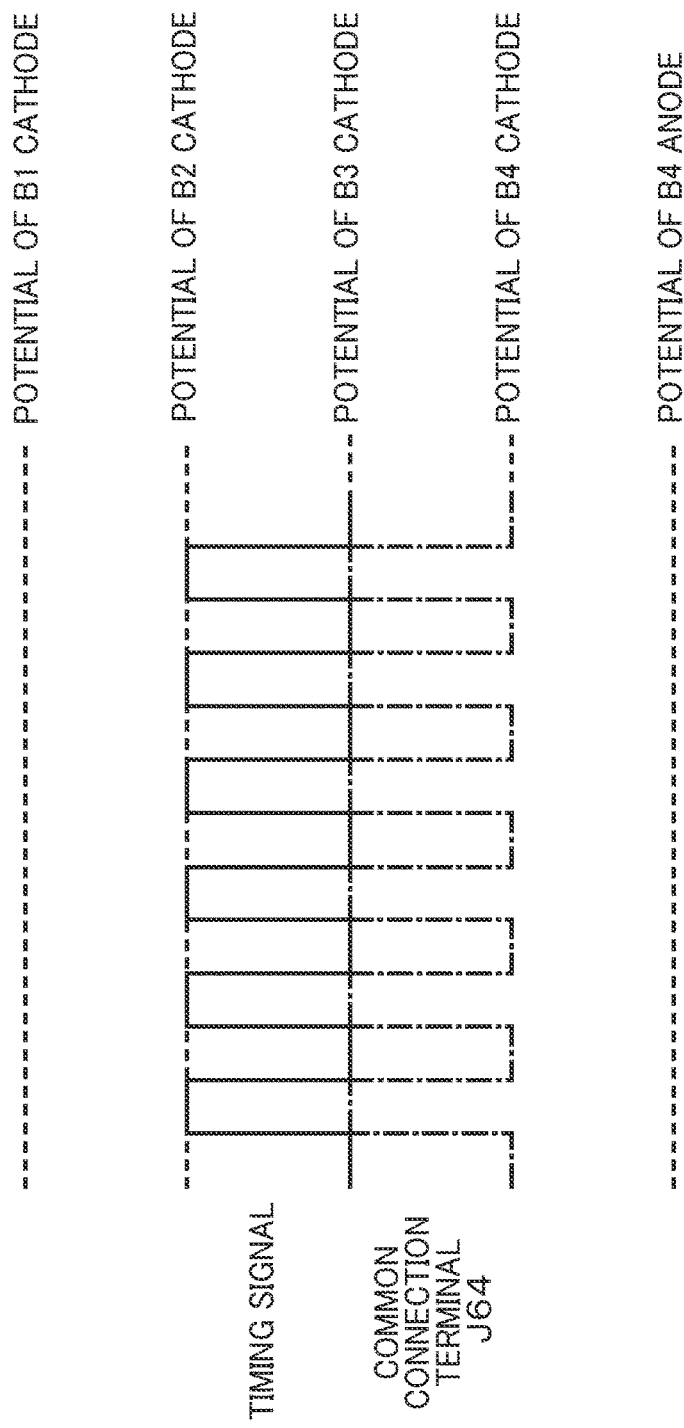
FIG. 19 illustrates an example of a voltage waveform of a control signal $\varphi 4$ and a voltage waveform of a timing signal provided to the control circuit 10A.

FIG. 19 illustrates an example of a waveform at the common connection point J64 and a waveform of a timing signal supplied to the control circuit 10A. As shown in FIG. 19, the timing signal supplied to the control circuit 10A is in a waveform synchronizing with the waveform at the common connection point J64, that is, in a waveform synchronizing with the control signals φ3, φ4. Further, as shown in FIG. 19, the timing signal is at a low level (potential of power storage cell B3 cathode) when the waveform at the common connection point J64 is at a low level and the timing signal is at a high level (potential of power storage cell B2 cathode) when the waveform at the common connection point J64 is at a high level.

As described above, the control signals can be precisely synchronized between or among the control circuits 10 according to the balance correction circuit 1 of the third embodiment since a timing signal generated based on a control signal generated by the control circuit 10 of one balance correction unit is supplied to the control circuit 10 of another balance correction unit for the another balance correction unit to generate a control signal based on this timing signal. Therefore, the aforementioned issues arising from the control signals not being synchronized can be prevented.

Further, the balance correction circuit 1 of the third embodiment need not have provided a capacitive element as in the second embodiment since the timing signal generated based on the voltage at the connection point common to the two switching elements S1 and the inductor L in the control circuit 10 of one balance correction unit is supplied to the control circuit 10 of another balance correction unit. Therefore, a mechanism for precisely synchronizing the control signals of the control circuits 10 can be realized in a further simplified configuration.

<Method of Generating Control Signal in Synchronization with Timing Signal>

In the above described embodiments, the control circuit 10 generates control signals based on the supplied timing signals in, for example, the following manner.

Figure 20:
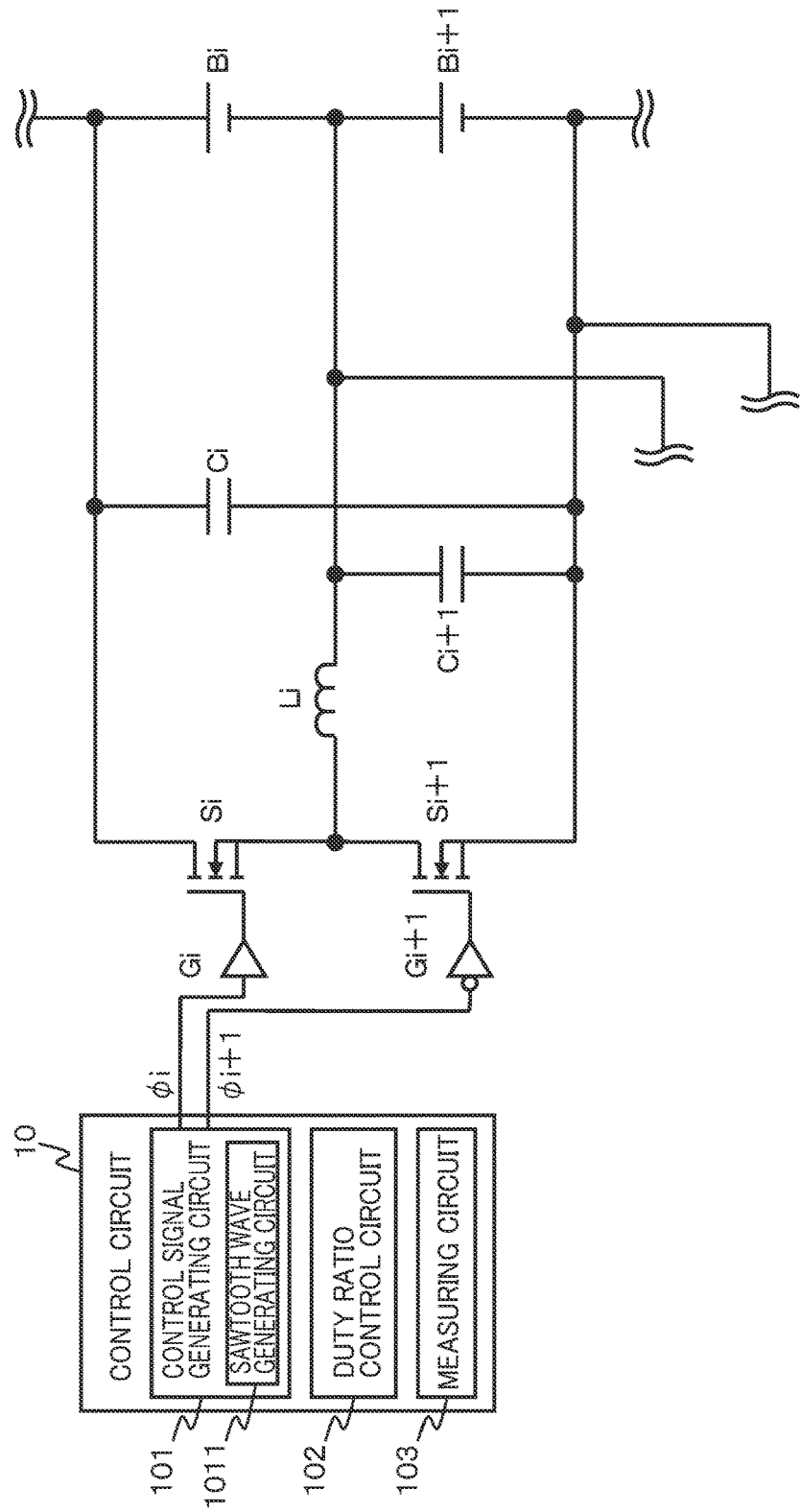
FIG. 20 is a diagram illustrating a mechanism of the control circuit 10 generating control signals which synchronize with the timing signal.

FIG. 20 illustrates a configuration of the balance correction circuit 1 described in the first to the third embodiments (the balance correction unit 1 is drawn in a generalized manner in FIG. 20.) As shown in FIG. 20, the control circuit 10 includes a control signal generating circuit 101, a duty ratio control circuit 102 and a measuring circuit 103. The basic configurations of these circuits are as aforementioned. And as shown in FIG. 20, the control signal generating circuit 101 includes a sawtooth wave generating circuit 1011. The sawtooth wave generating circuit 1011 generates a sawtooth wave synchronizing with the input timing signal.

Figure 21:
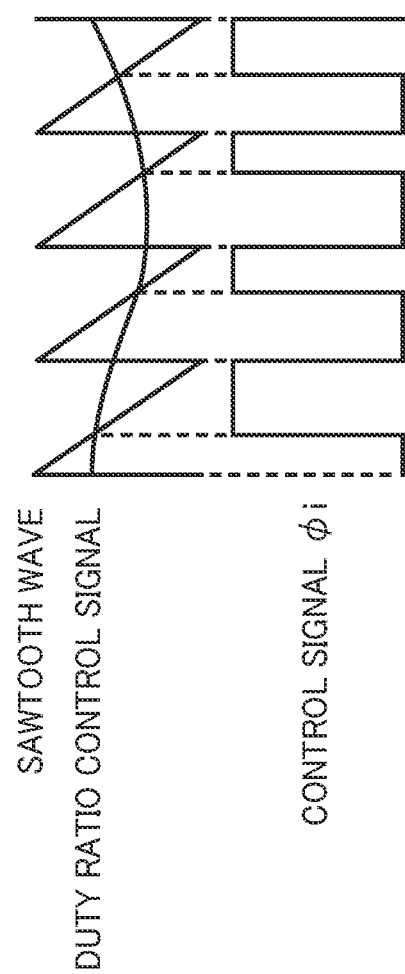
FIG. 21 is a diagram illustrating how the control signal generating circuit 101 generates control signals $\varphi i$, $\varphi i+1$.

As shown in FIG. 21, the control signal generating circuit 101 compares the duty ratio control signal input from the duty ratio control circuit 102 to the sawtooth wave generated by the sawtooth wave generating circuit 1011 to thereby generate control signals φi (i=1, 3, 5 . . . ) and control signals φi+1 which are in phases opposite the control signals φi. For the sake of brevity of description, FIG. 21 only shows control signals φi.

Figure 22:
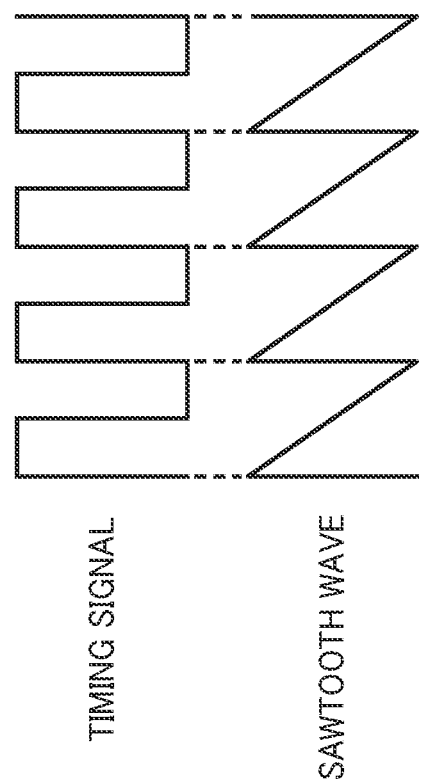
FIG. 22 is a diagram illustrating a mechanism of the sawtooth wave generating circuit 1011 generating a sawtooth wave synchronizing with the timing signal.
Figure 23:
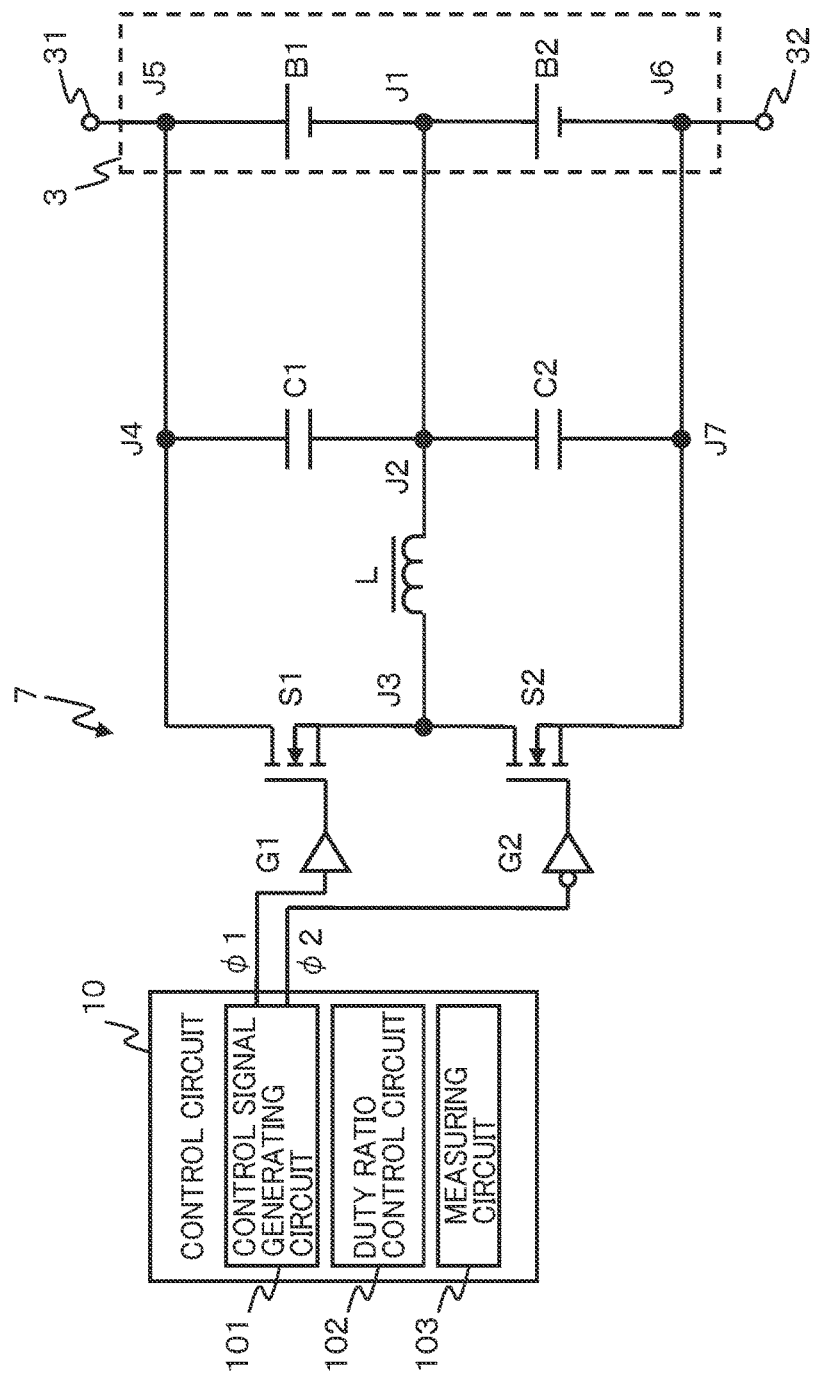
FIG. 23 illustrates an example of a converter type balance correction circuit 7.
Figure 24:
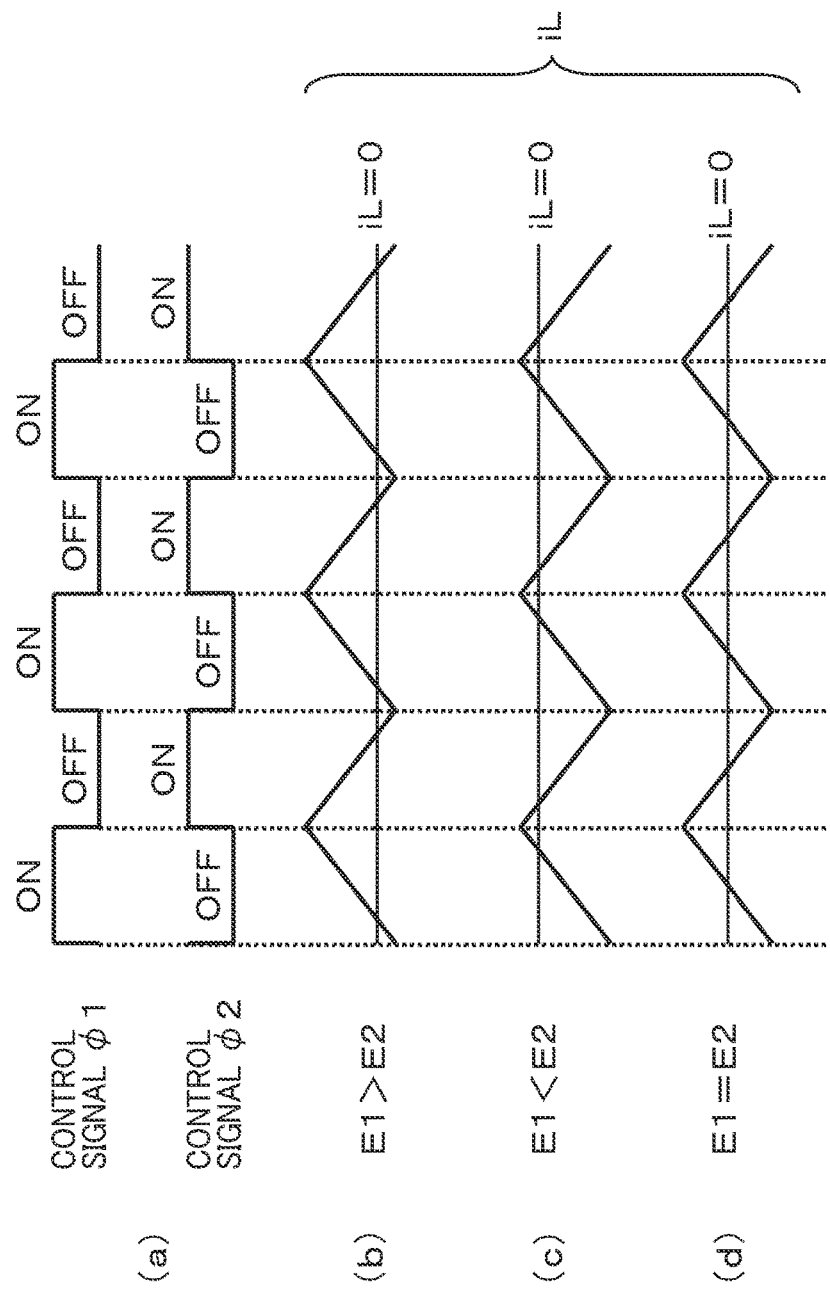
FIG. 24 illustrates in (a) waveforms of the control signals $\varphi 1$, $\varphi 2$ output by the control circuit 10 during the first period and (b) to (d) waveforms of currents flowing through the inductor L during the first period.
Figure 25:
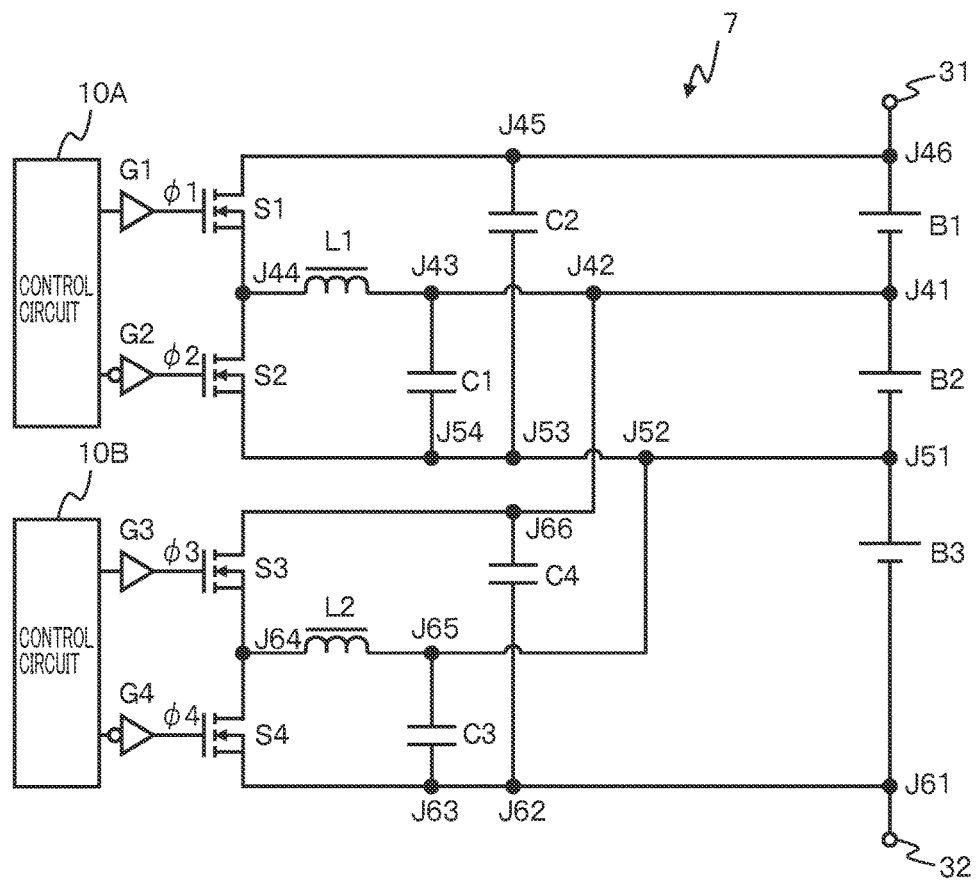
FIG. 25 illustrates an example of a balance correction circuit 7 adapted to equalize the voltages of three power storage cells B1 to B3.
Figure 26:
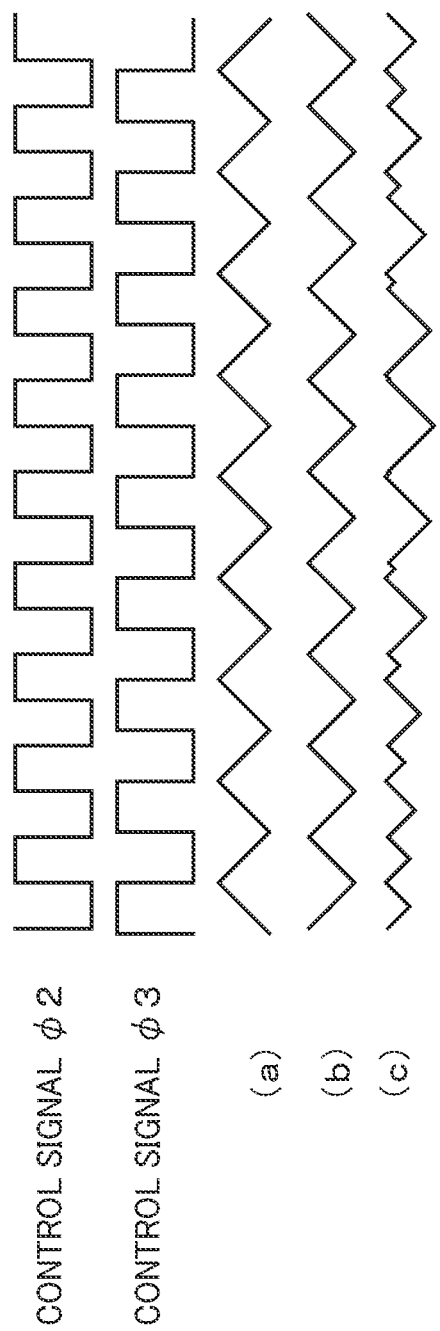
FIG. 26 illustrates an example of a waveform generated at the connection point J42 when the frequencies of the control signals are not synchronized.

The sawtooth wave generating circuit 1011, for example, as illustrated in FIG. 22, generates a sawtooth wave synchronizing with a timing signal by resetting to the maximum value (or minimum value) the sawtooth wave at a timing when the timing signal transitions from a low level to a high level (inverse theory (high level to low level) may do.)

From the description above, the control circuit 10 can generate control signals (control signals φi, φi+1) which are synchronized with the timing signals input from the outside.

The foregoing embodiments are intended to facilitate the understanding of the present invention but not to limit the invention. And it is needless to say that modifications and improvements of the present invention are possible without departing from the scope of the invention, and equivalents thereof are also encompassed by the invention.

For example, the balance correction circuit according to the present invention may be provided separate from the power storage cell or may configure a battery pack and the like which is made integral with a power storage cell.

REFERENCE SIGNS LIST

1 balance correction circuit, 10A to 10C control circuit, 101 control signal generating circuit, 1011 sawtooth wave generating circuit, 102 duty ratio control circuit, 103 measuring circuit, 100 timing signal supply device, L1 to L3 inductor, C1 to C6 capacitive element, B1 to B4 power storage cell, S1 to S6 switching element, D1, D2 rectifying element

The invention claimed is:

1. A balance correction device that is in an assembled battery including a plurality of series connected power storage cells and equalizes voltages of the power storage cells or of power storage modules that include the series connected power storage cells, the balance correction device comprising:
   a plurality of balance correction units including
      an inductor that has one end thereof connected to a connection point between a first one of the power storage modules and a second one of the power storage modules connected in series,
      a first switching element that is series connected together with the inductor between positive and negative terminals of the first power storage module,
      a second switching element that is series connected together with the inductor between positive and negative terminals of the second power storage module,
      a switching control unit that controls a supply of a current to each of the power storage modules by an on/off control of the first switching element and the second switching element to equalize the voltages of the power storage modules by exchanging electric power of the power storage modules via the inductor; and
   a timing signal supply unit that supplies to the respective switching control unit of the balance correction units, a common timing signal used to generate a control signal to input to the first switching element and the second switching element to on/off control the first switching element and the second switching element,
   wherein a first power storage module of one of the balance correction units is connected to another balance correction unit so that it becomes the second power storage module of the other balance correction unit.

2. The balance correction device according to claim 1, wherein
   the timing signal supply unit directly supplies the timing signal to the respective switching control unit of the balance correction units.

3. The balance correction device according to claim 1, wherein
   the timing signal supply unit includes
   a first circuit that supplies the timing signal to the switching control unit of a second one of the balance correction units and
   a second circuit that supplies the timing signal supplied from the timing signal supply unit by the second balance correction unit, to the switching control unit of a first one of the balance correction units.

4. The balance correction device according to claim 3, wherein
   the second circuit generates a timing signal based on the control signal that the switching control unit of the second balance correction unit generates and supplies the generated timing signal to the switching control unit of the first balance correction unit.

5. The balance correction device according to claim 4, wherein
   the second circuit generates the timing signal based on a variation in voltages applied to a capacitive element that is charged by a voltage difference created between the control signal that is generated by the switching control unit of the second balance correction unit and a cathode of the second power storage module of the second balance correction unit.

6. The balance correction device according to claim 5, wherein
the second circuit charges the capacitive element by a voltage obtained by rectifying a voltage applied to the capacitive element.

7. The balance correction device according to claim 6, wherein
the second circuit generates the timing signal based on a divided voltage obtained by dividing a voltage applied to the capacitive element.

8. The balance correction device according to claim 3, wherein
the second circuit generates the timing signal based on a voltage generated at a common connection part of the first switching element and the second switching element of the switching control unit of the second balance correction unit and the inductor.

9. The balance correction device according to claim 8, wherein
the second circuit generates the timing signal based on a variation in voltages obtained by rectifying the voltages generated at the common connection part.

10. The balance correction device according to claim 9, wherein
the second circuit generates the timing signal based on a variation in voltages obtained by dividing the voltages generated at the common connection part.

11. A power storage device including the plurality of power storage cells and the balance correction device according to claim 1.

12. The power storage device including the plurality of power storage cells and the balance correction device according to claim 2.

13. The power storage device including the plurality of power storage cells and the balance correction device according to claim 3.

14. The power storage device including the plurality of power storage cells and the balance correction device according to claim 4.

15. The power storage device including the plurality of power storage cells and the balance correction device according to claim 5.

16. The power storage device including the plurality of power storage cells and the balance correction device according to claim 6.

17. The power storage device including the plurality of power storage cells and the balance correction device according to claim 7.

18. The power storage device including the plurality of power storage cells and the balance correction device according to claim 8.

19. The power storage device including the plurality of power storage cells and the balance correction device according to claim 9.

20. The power storage device including the plurality of power storage cells and the balance correction device according to claim 10.

\* \* \* \* \*